(12) United States Patent
Pchelnikov et al.

(10) Patent No.: US 6,564,658 B2
(45) Date of Patent: May 20, 2003

(54) ELECTROMAGNETIC METHOD OF LIQUID LEVEL MONITORING

(75) Inventors: Yuriy N. Pchelnikov, Cary, NC (US); David S. Nyce, Apex, NC (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 10/253,122

(22) Filed: Sep. 24, 2002

(65) Prior Publication Data

US 2003/0019291 A1 Jan. 30, 2003

Related U.S. Application Data

(63) Continuation-in-part of application No. 09/321,177, filed on May 27, 1999, now abandoned, which is a continuation-in-part of application No. 09/134,056, filed on Aug. 14, 1998, now Pat. No. 6,293,142.

(51) Int. Cl.[7] ............................................... G01N 33/00
(52) U.S. Cl. ......................................... 73/866; 324/622
(58) Field of Search ................................ 73/290 R, 488, 73/866; 324/600, 605, 621, 622, 629, 630

(56) References Cited

U.S. PATENT DOCUMENTS 6,018,247 A * 1/2000 Kelly .......................... 324/644

* cited by examiner

*Primary Examiner*—Richard A. Moller
(74) *Attorney, Agent, or Firm*—David M. Ostfeld

(57) ABSTRACT

A method and apparatus for monitoring one or more parameters of a variable physical structure, such as liquid level, is disclosed. The method and apparatus includes an electrodynamic element placed in proximity to a monitored structure and exciting within said element an alternating electromagnetic field. The electromagnetic field should be at a frequency at which the electromagnetic field penetrates into the monitored structure and then variations of the electromagnetic field parameters are measured for the element caused by a variation in the structure. The exciting of the electrodynamic element is by an electromagnetic field in the form of at least one slowed electromagnetic wave having suitable energy distribution of the electric and magnetic fields for the measuring of the electromagnetic field parameters.

26 Claims, 19 Drawing Sheets

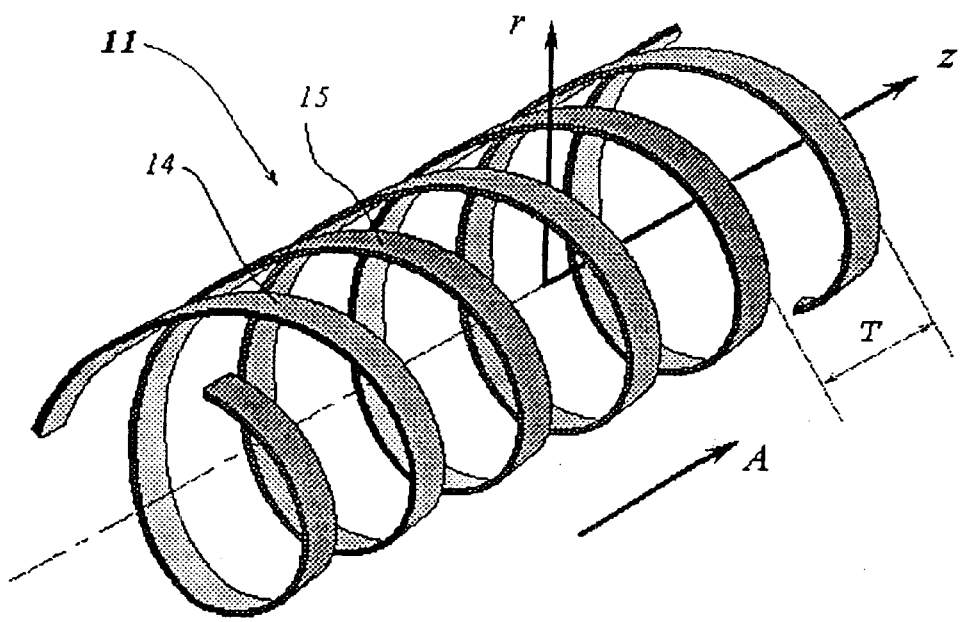
Figure 15.
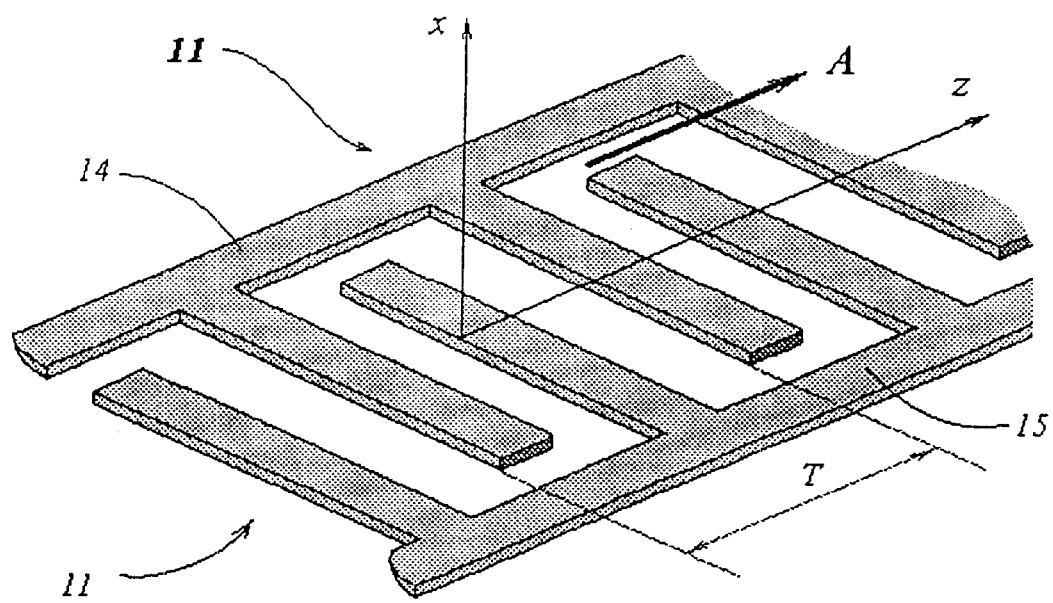
Fgure 16.

ELECTROMAGNETIC METHOD OF LIQUID LEVEL MONITORING

This is a continuation-in-part of U.S. patent application Ser. No. 09/321,177, filed May 27, 1999, now abandoned, which is a continuation-in-part of U.S. patent application Ser. No. 09/134,056, filed Aug. 14, 1998, by Pchelnikov et al., for Electromagnetic Method of Liquid Leval Monitoring, now U.S. Pat. No. 6,293,142.

FIELD OF THE INVENTION

The present invention relates to a liquid level and other height measurements, more specifically, to an electromagnetic method and apparatus for measuring liquid level for different liquids (conducting and non-conducting) and also for measuring clearance or thickness.

BACKGROUND OF THE INVENTION

The usefulness of the RF or microwave field application for monitoring of liquid level is recognized by the prior art. Such devices can operate with either RF or microwave excitation. When an electromagnetic field is excited in the container partially filed with liquid, parameters of the electromagnetic field, such as resonant frequency, vary with the level of the liquid. In particular the state of the art is shown in V. A. Viktorov "Microwave Method of Level Measurement", *The Resonance Method of the Level Measurement, Moscow: Energija.* 1987, disclosing an electrodynamic element, made as section of a long line, inserted into a monitored container where the resonant frequency is measured.

A general discussion, see Viktorov V. A., Lunkin B. V., Sovlukov A. S. "Method of and Apparatus for Level Measurement by Hybrid Electromagnetic Oscillation Excitation", *Radio-Wave Measurements, Moscow: Energoatomizdat,* 1989, states that an electrodynamic element is placed in a monitored container, and the element's resonance frequency has a direct correlation to the level of the liquid within the container.

Slowed electromagnetic waves and slow-wave structures are also well known in the field of microwave engineering, see J. R. Pierce, "Traveling-Wave Tubes" D. Van Nostrand Company, Inc., Princeton, N.J., 1950. These waves are electromagnetic waves propagating in one direction with a phase velocity $v_p$ that is smaller than the light velocity c in a vacuum. The relation $c/v_p$ is named slowing or deceleration and is designated as n. In the most practically interesting cases, slowed electromagnetic waves are formed in slow-wave structures by coiling one or two conductors (for example, into a helix, as it is shown in FIG. 1 (prior art), where the other conductor is a cylinder), which increases the path length traveled by the wave, or by successively connecting resonant elements or cells, energy exchange between which delays the phase of the wave, or by using an electrodynamically dense medium (usually a dielectric), or a combination of these methods. Additional deceleration was also obtained due to positive electric and magnetic coupling in coupled slow-wave structures, see V. V. Annenkov, Yu. N. Pchelnikov "Sensitive Elements Based on Slow-Wave Structures" *Measurement Techniques,* Vol. 38, # 12, 1995, pp. 1369–1375.

The slow-wave structure-based sensitive elements are known in the art, see Yu. N. Pchelnikov, I. A. Uvarov and S. I. Ryabtsev, "Instrument for detecting Bubbles in a Flowing Liquid", Measurement Techniqies, Vol. 22, # 5, 1995, pp.559–560, and Yu N. Pchelnikov, "Possibility of Using a Cylindrical Helix to Monitor the Continuity of Media", *Measurement Techniques*, Vol. 38, #10, 1995, pp.1182–1184. The slowing of the electromagnetic wave leads to a reduction in the resonant dimensions of the sensitive elements and this enables one, by using the advantages of electrodynamic structures, to operate at relatively low frequencies, which are more convenient for generation and are more convenient for primary conversion of the information signal, but sufficiently large to provide high accuracy and high speed of response. The low electromagnetic losses at relatively low frequencies (a few to tens of megahertz) also helps to increase the accuracy and sensitivity of the measurements. The slowing of the electromagnetic wave leads also to energy concentration in the transverse and longitudinal directions, that results in an increase in sensitivity, proportional to the slowing down factor n. See V. V. Annenkov, Yu. N. Pchelnikov "Sensitive Elements Based on Slow-Wave Structures" *Measurement Techniques,* Vol. 38, # 12, 1995, pp. 1369–1375.

Most slow-wave structures were made as two-conductor periodic transmission lines (see Dean A. Watkins "Topics in Electromagnetic Theory", John Willy & Sons, Inc. Publishers). A version is possible when a slow-wave structure contains three or more different conductors. In all cases the slowed wave is excited in the electrodynamic element between different combinations of the two conductors. The coiled conductors increasing the wave path are named "impedance conductors", and conductors with simple configuration such as rods, tapes, etc., stretched along the wave propagation direction are named "screen conductors", see V. V. Annenkov, Yu. N. Pchelnikov "Sensitive Elements Based on Slow-Wave Structures" *Measurement Techniques,* Vol. 38, # 12, 1995, pp. 1369–1375.

Both the prior art and the present invention measure one or more parameters of an electromagnetic field. Some of the prior art methods and present invention use an electrodynamic element, some are made as a resonant cavity filled with measured liquid or made as an electrodynamic element placed in or outside a container. The electrodynamic element is connected to an external RF or microwave signal generator which is used to excite an electromagnetic field. The change in, for example, the level of the liquid, causes a shift in the characteristics of the electromagnetic field in the electrodynamic element. The shift in characteristics correlates to a change, for example, in the level of the liquid within the measured container.

Devices used in the prior art exhibit several problems overcome by the present invention. Previous methods depend upon the sensitivity of a measured parameter of an electromagnetic field to measure level displacement and provide signal resolution. Sensitivity and resolution increase with frequency. However, the increase in frequency is accompanied by an increase in electromagnetic losses, such losses causing a loss of accuracy of the measurement. Besides, it is known that the higher frequency is, the higher is the cost of an electronics. The relatively low accuracy realized from the prior art is also due to resonant frequency dependence on the monitored liquid's electric parameters. Thus, there is a need in the art for an electromagnetic method and apparatus for monitoring liquid levels and other heights measurements that has better sensitivity, better resolution, greater diversity and lower cost.

SUMMARY OF THE INVENTION

The present invention employs slow-wave structures in electrodynamic elements Contrary to the capacitance and inductance sensitive elements, slow-wave structure-based sensitive elements are electrodynamic elements and can be characterized by the electrodynamic parameters such as resonant frequencies, Q-factor or attenuation, phase shift, etc. The main advantages of such "sensitive electrodynamic elements", in comparison to known ones, are: concentration of electromagnetic energy in a small volume, the independence of their electrodynamic parameters upon the electronic circuit parameters and the dependence on the monitored liquid level or the measured height.

Frequency decrease is achieved due to slowing. Sensitivity increase is achieved due to electromagnetic energy concentration near the surface of the level to be measured and due to splitting electric and magnetic fields for the monitored volume. The measured parameters range is widened due to wide frequency band of slow-wave structures. The application convenience is due to possibility of placing of the electrodynamic element outside the monitoring level. The slow-wave structure-based electrodynamic elements are designed, as a rule, on dielectric base, stable to temperature alteration and its resonant frequency dependence on temperature is very small, contrary to, for example, cavity resonators.

The present invention teaches an electromagnetic method of measuring the liquid level and other heights or other measurements that require high resolution wherein an excited electromagnetic wave with a preset distribution of the electric and magnetic components of the electromagnetic field makes it possible to increase the sensitivity and accuracy of measurement of the level, using relatively low frequencies. The method is implemented in an apparatus, for example, for measuring liquid level, wherein the structural form of the electrodynamic element, used as the sensing element allows increased sensitivity and accuracy. In the invention an electrodynamic element is made at least one section of a slow-wave structure.

It is known, that the dielectric or conducting materials, placed in the electromagnetic field, alter its parameters, for example, its velocity, that leads to the phase delay or resonant frequency alteration. The degree of such alteration and, therefore, sensitivity S is proportional to the relation of the volume V of a material to the monitored volume $V_0$, for example, a volume of a resonator, and depends on the electric and magnetic field distribution in the monitored volume $$S \sim (V/V_0) F(\epsilon, m, s) f,$$

where here $\epsilon$ and $\mu$ are relative permittivity and permeability, $\sigma$ is conductivity of a material, $F(\epsilon, \mu, \sigma)$ is some function, depending on the material position in the monitored volume V, and $f$ is frequency and the sign means proportionality. See V. A. Viktorov, B. V. Lunkin and A. S. Sovlukov, "Radio-Wave measurements" Moscow: *Energoatomizdat*, 1989, p. 27. If, for example, dielectric material is monitored, it should be placed in the electric field and its effect will be proportional to the electric field energy in the material. Since the resonant volume $V_0$ is smaller when the first resonant frequency $f_1$ is higher, the sensitivity S rises with frequency increasing. Slowing of an electromagnetic wave n times leads to an n times decrease of the resonant volume $V_0$, that is accomplished by the sensitivity n-times increasing $$S \sim (V/V_0) n F(\epsilon, \mu, \sigma) f_1.$$

The sensitivity increasing permits lower frequency and works with smaller losses, which, for example, in conductors are proportional to the square root of frequency. See: E. C. Young "The Penguin Dictionary of Electronics", second edition, Penguin Books, p. 530. The electromagnetic losses decrease leads to resolution increase.

When resonant frequency of a metal container, filed with liquid, is measured, the resonant frequency depends not on the liquids level only; it depends on temperature also since the liquid's permittivity and the container's volume change with temperature change. The slow-wave structure-based electrodynamic elements are designed, as a rule, on dielectric base and its resonant frequency depends on temperature very small.

DESCRIPTIONS OF THE DRAWINGS

For further understanding of the nature and objects of the present invention, reference should be had to the following figures in which like parts are given like reference numerals and wherein:

FIG. 15 shows a bifilar helix;

FIG. 16 illustrates interdigital combs;

DETAILED DESCRIPTION OF THE PREFERRED EMBODIMENTS

Figure 1:
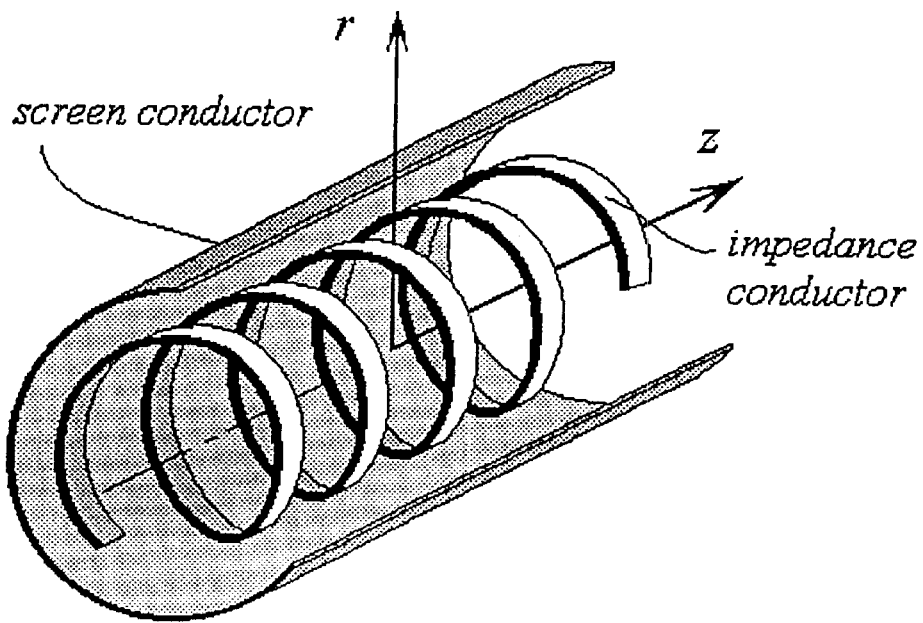
FIG. 1 illustrates a slow-wave structure of the prior art, coiling one conductor into helix, the other conductor is a cylinder.
Figure 2:
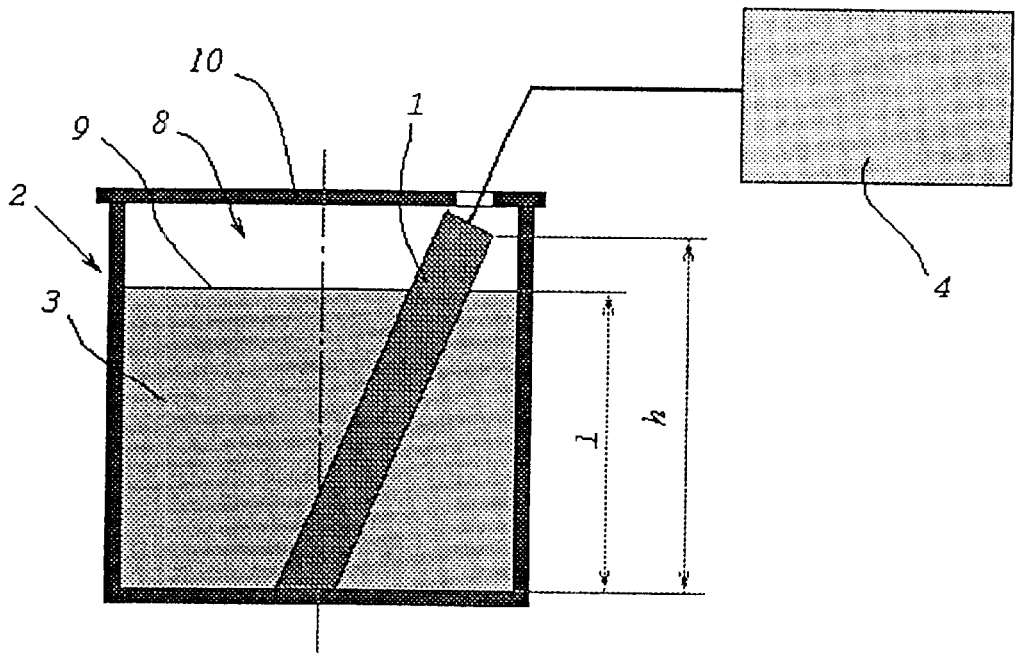
FIG. 2 illustrates a preferred embodiment of the present invention in which the electrodynamic element is placed inside a container and in the fluid to be measured.
Figure 6:
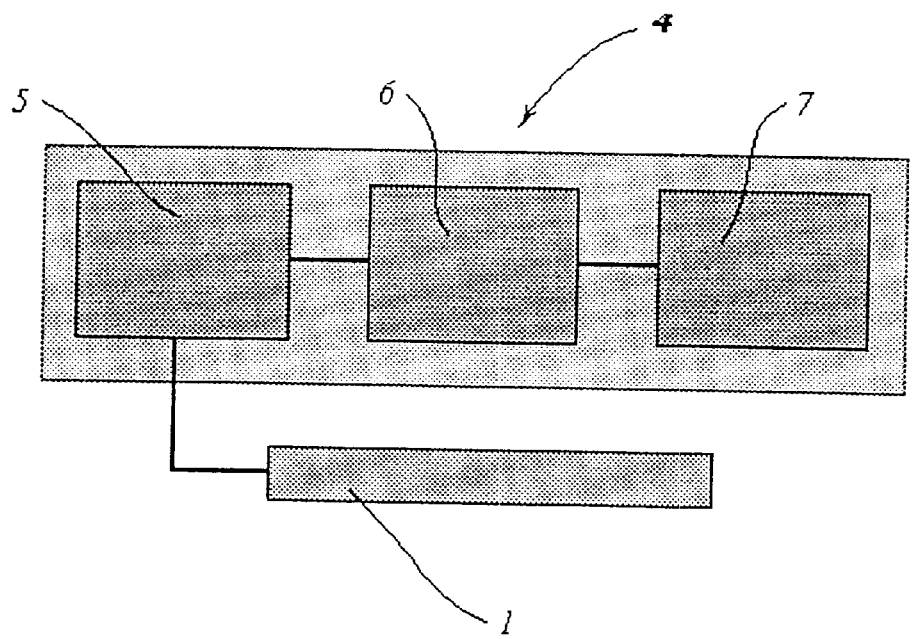
FIG. 6 illustrates the measuring circuit of the preferred embodiment of the present invention.
Figure 7:
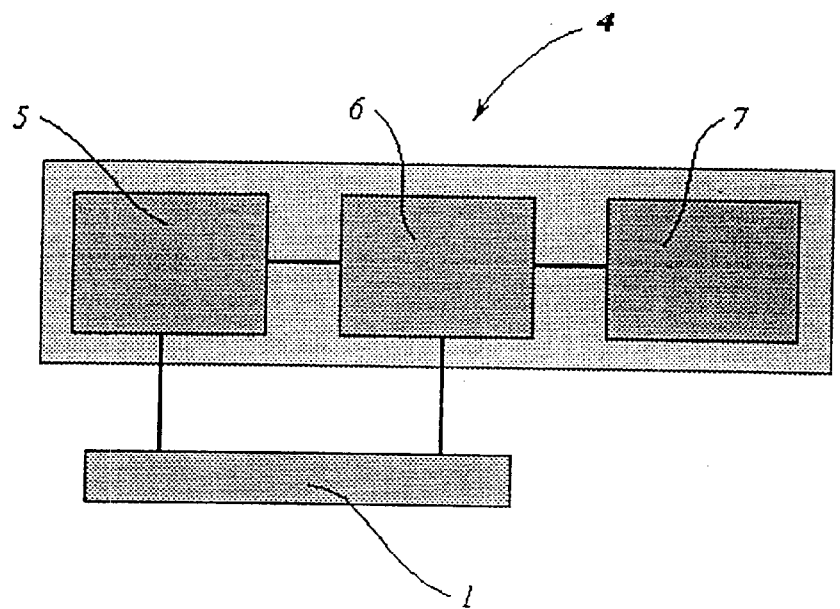
FIG. 7 illustrates a second measuring circuit of the preferred embodiment of the present invention.

As shown in FIGS. 2–5, an electrodynamic element 1 may be placed inside (FIGS. 2 and 3) or outside (FIGS. 4 and 5) a container 2, filed with liquid 3, or other material. An element 1 can be placed into container 2 at an angle 90° or at an angle other than 90°, as shown in FIG. 2. An element 1 is connected to the measuring circuit 4, comprising (FIGS. 6 and 7) a generator 5 of electromagnetic oscillations at RF frequency, primary transducer 6, converting the electromagnetic parameters of the electrodynamic element 1 into an electromagnetic informative signal, for example, phase delay, frequency, power attenuation, etc., and converter 7, converting electromagnetic informative signals into information about a liquid level, height, etc. The electromagnetic element 1 can be connected to the generator 5 with one end, in parallel, as it is shown in FIG. 6, or can be connected with both ends, in series, between generator 5 and transducer 6, as it is shown in FIG. 7.

Figure 3:
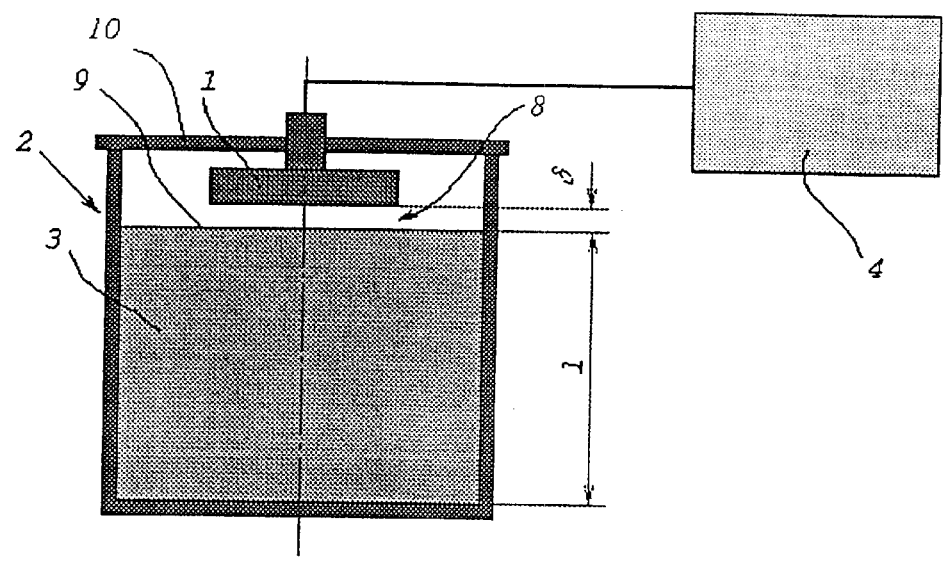
FIG. 3 is an illustration of the preferred embodiment of the present invention showing the electrodynamic element placed inside the container but not contacting the fluid to be measured.

At least one slowed electromagnetic wave is exited in the electrodynamic element 1 at a frequency at which the electromagnetic field penetrates into liquid 3. The region 8 formed between the surface 9 of the liquid 3 and the roof 10, becomes the monitored volume inside container 2. If the container 2 is made from metal, electrodynamic element 1 must be placed inside container 2, as it is shown in FIGS. 2 and 3. If it is made from dielectric or has a dielectric roof or has a dielectric window, the electrodynamic element 1 can be placed outside container 2, as it is shown in the FIGS. 4 and 5. In all mentioned cases the electromagnetic field excited in the electrodynamic element 1 penetrates into the monitored region, e.g. liquid 3 and region 8, that is, the distance δ between the electrodynamic element 1 and liquid 3 must not exceed the thickness of an "aria of the energy concentration" which is approximately equal to $\lambda/2\pi n$, where $\lambda$ is a wave-length in vacuum. In FIG. 2 it can be a thickness of a protective covering on the electrodynamic element 1 (not shown in Figures), in FIG. 3 it is the region 8 height, in FIG. 4 it is the container 2 wall thickness, in FIG. 5 it is the roof 10 thickness plus the region 8 height. The sensor may be used at an angle other than 90°.

Figure 8:
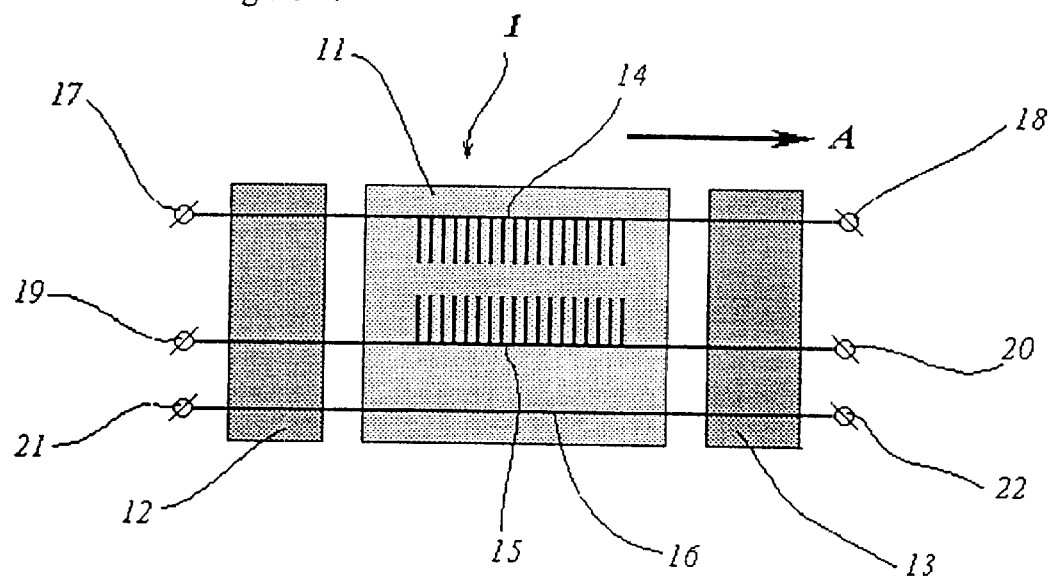
FIG. 8 is an illustration of the electrodynamic element of the preferred embodiment of the present invention.

The electrodynamic element 1 comprises slow-wave structure 11 (FIG. 8), one end of which is connected to the input 12 and the other end—to the output 13, the last two being included in the electrodynamic element 1. Depending on the quantity (number) of slow-wave structure 11 conductors (impedance conductors 14, 15 and a screen conductor 16 in FIG. 8), the input 12 and the output 13 have two or more poles connected with slow-wave structure 11. For example, as it is shown in FIG. 8, the poles 17, 18 are connected to the opposite ends of impedance conductor 14, the poles 19, 20 are connected to the opposite ends of the other impedance conductor 15, the poles 21 and 22 are connected to the opposite ends of the screen conductor 16.

One or more types of slowed waves at one or different frequencies can be excited in such element simultaneously, their number being equal to the number of conductors minus one. See Le Blond A., Mourier G. "L'etude des Lignes a bareux a structure periodique pour les tubes electroniques U.H.F." *Ann. Radioelektr.,* 1954, 9, # 38, p. 311 or Z. I. Taranenko, Ya. K. Trochimenko "Slow-Wave Structures" *Kiev,* 1965, p.57.

Figure 4:
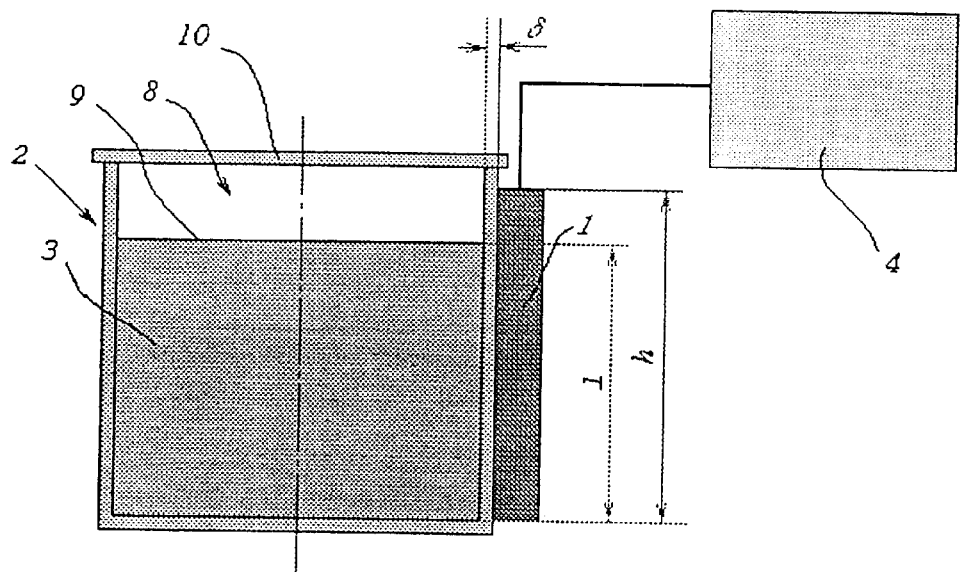
FIG. 4 shows a preferred embodiment of the present invention in which the electrodynamic element is placed outside the container holding the fluid in one configuration.
Figure 5:
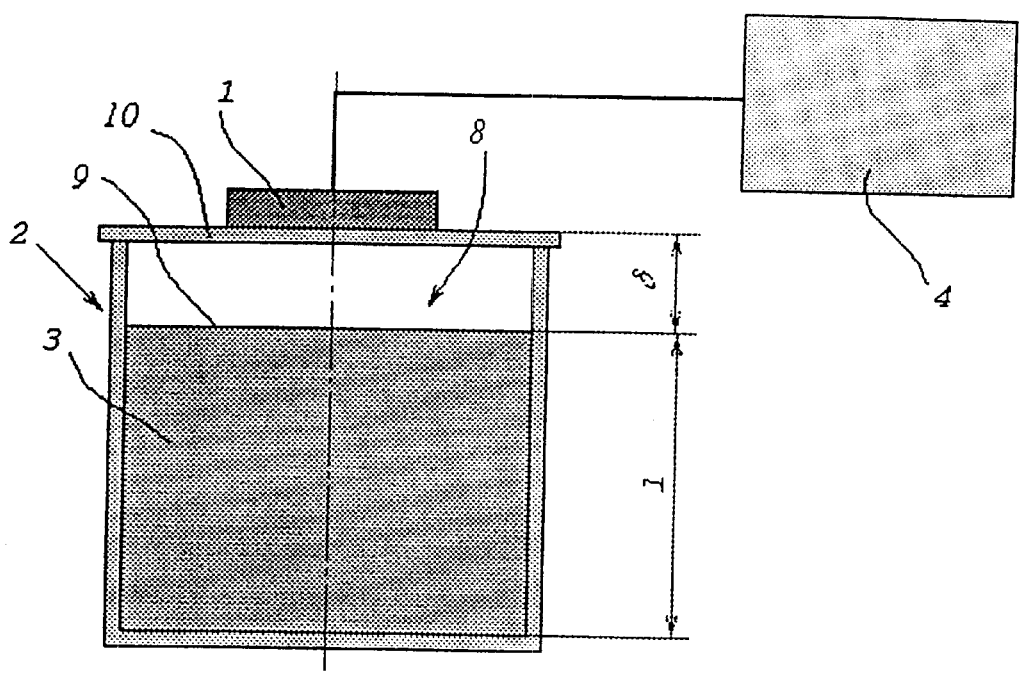
FIG. 5 shows a preferred embodiment of the present invention showing the electrodynamic element is placed outside the container holding the fluid in one configuration.

The excited slowed electromagnetic wave in the electrodynamic element 1 propagates along this element crossing the liquid's surface 9 as it is shown in FIGS. 2 and 4, or not crossing it, as it is shown in FIGS. 3 and 5. In both cases electric parameters of the liquid 3, or another material have an effect on the slowing n of the wave, that leads to alteration of electromagnetic parameters of the electrodynamic element 1. The difference is that in the first case the range of the monitored level l is near to the height h of the electrodynamic element 1, in the second case it is much smaller and can not exceed the area of slowed wave energy concentration $\lambda/2\pi n$.

Any electromagnetic wave is characterized by so called "wave coefficient", defining electric and magnetic fields E and H dependence on time t and coordinate z in the direction of wave propagation:

$$E, H \sim e^{j\omega t + \gamma z},$$

where w is an angular frequency and $\gamma$ is a propagation constant, which can be presented by the expression $$\gamma = -j\beta - \alpha.$$

Here $\beta$ is the phase constant ($\beta = \omega/v_p$), $v_p$ is the phase velocity, $\alpha$ is the attenuation constant, related to the specific attenuation factor $K_a$ in decibels/meters by the relation $$K_a = 8.68\alpha.$$

See V. V. Annenkov, Yu. N. Pchelnikov "Sensitive Elements Based on Slow-Wave Structures" *Measurement Techniques*, Vol. 38, #12, 1995, pp. 1369–1375.

The slowed electromagnetic wave is excited in electrodynamic element 1 with distribution of the electric and magnetic components of the field required for the best sensitivity. Usually, the field distribution is defined by the slowing n and the frequency $f$. Thus, when there is no boundary surface outside the impedance conductor, the longitudinal components of the electric field $E_z$ and the magnetic field $H_z$ of the wave are proportional to $e^{-x\tau'}$, $e^{-x\tau''}$ for a plane system (curves 23 and 24 in FIG. 9), and are proportional to modified Bessel functions $I_0(r\tau')$, $I_0(r\tau'')$ inside of a cylindrical slow-wave structure (curves 25, 26 in FIG. 10), or $K_0(r\tau')$, $K_0(r\tau'')$ outside it (curves 27, 28) Here x and r are the coordinates along the normal to the surfaces of the impedance conductors and $\tau'$, $\tau''$ are two different meanings of the transverse constant $\tau$, related to the different slowing values n', n" and the wave number k by the relations $$(\tau')^2 = k^2[(n')^2 - 1],$$

$$(\tau'')^2 = k^2[(n'')^2 - 1],$$

$$k = \omega^2 \epsilon_0 \mu_0,$$

where $\epsilon_0$ and $\mu_0$ are the permittivity and the permeability of the vacuum, respectively. If the frequency changes and slowing n is constant, the wave number has different values, for example, k', k" that leads to transverse constant changing also $$(\tau')^2 = (k')^2(n^2 - 1)$$

$$(\tau'')^2 = (k'')^2(n^2 - l)$$

Figure 9:
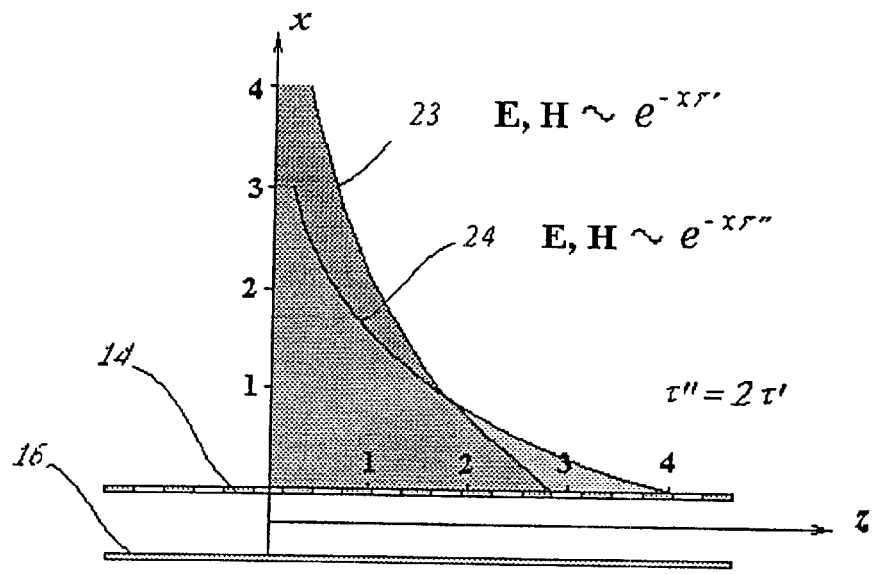
FIG. 9 is a graph of the electric and magnetic fields near the plane electrodynamic element of the preferred embodiment of the present invention.
Figure 10:
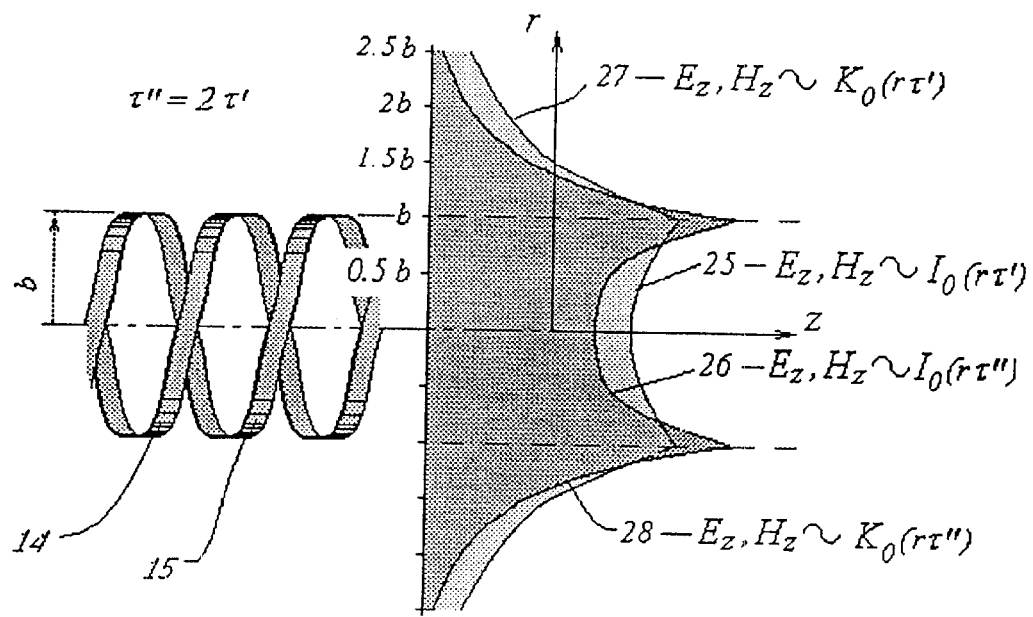
FIG. 10 is a graph of the electric and magnetic fields inside and outside the cylindrical electrodynamic element of the preferred embodiment of the present invention.

In FIGS. 9 and 10 $\tau'' = 2\tau'$.

It is seen from the expressions for $\tau'$, $\tau''$ and is shown in FIGS. 9 and 10, that a field distribution can be changed as by slowing n change, as by angular frequency $\omega$ change also. Thus, one can obtain different distribution of the field in the same electrodynamic element, exciting, for example, two or more slowed waves at different frequencies.

The field distribution can be changed by the different modes of the slowed wave exciting also. For example, the field distribution in FIG. 10 for bifilar helix was calculated for in-phase excitation. In case of anti-phase excitation the field distribution is defined by Bessel functions of the first order and is quite different from the distribution shown on FIG. 10.

One of the most important peculiarities of slowed waves is the electric and magnetic field energy splitting between electric and magnetic type waves (E- and H-modes, respectively). See L. N. Loshakov, Yu. N. Pcel'nikov "Theory and the Traveling-Wave Tube Amplification Calculation, M: Sov. Radio, 1964. When the slowing n is sufficiently great, the energy of the electric field of the slowed wave is concentrated mainly in the E-mode, while the energy of magnetic field is concentrated mainly in the H-mode, both modes existing in the slowed wave only together. Because of this the electromagnetic parameters of the monitored medium (the conductivity, the permittivity, and the permeability) have a different effect on the E-modes and H-modes, thus manifesting their own kind of an anisotropy. See Yu. N. Pchel'nikov "Anisotropy of a Semiconductor Film in the Field of a Slow Wave", *Journal of Communications Technology and Electronics, Vol.* 39, # 10, 1994, pp. 66–69. This enables one, on the one hand, to make independent measurements, for example, of the electric permittivity and magnetic permeability, while on the other hand it enables one to control the distribution of the electric and magnetic fields across the transverse section of the electrodynamic element 1. Thus, screening by a screen conductor of the E-mode reduces the amount of the electric-field energy in the measured volume compared with the amount of the magnetic-field energy by more than a factor of $n^2$.

Figure 11:
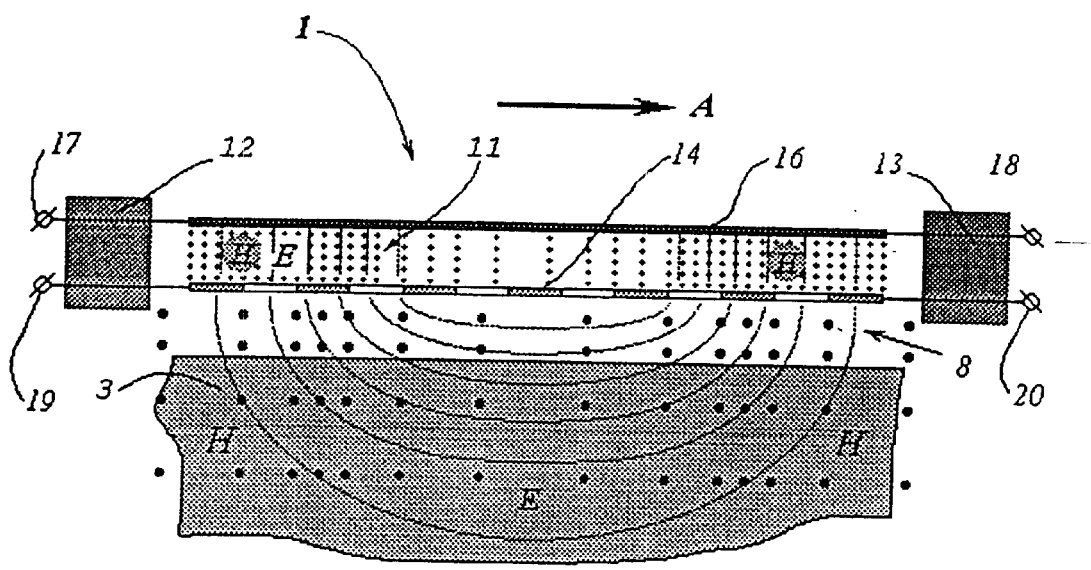
FIG. 11 illustrates a two-conductor slow-wave structure with an impedance conductor and a screen conductor, showing the field of the preferred embodiment of the present invention.

In the simplest cases, the distribution of electric and magnetic fields is as shown in FIGS. 9 and 10 and is formed, for example, by a two-conductor slow-wave structure 11 with an impedance conductor 14 and a screen conductor 16 (FIG. 11). Here an electric (E) field and a magnetic (H) field is distributed between conductors 14, 16 and outside the impedance conductor 14. The field distribution can be changed essentially in so called coupled slow-wave structures, which impedance conductors 14, 15 have configuration of turned through 180°, mirror images of one another, for example, oppositely directed radial spirals, shown in FIG. 12. Electric and magnetic energy can be split in transverse section of such structures and this splitting can be controlled by exciting in-phase or anti-phase types of waves.

When exciting an in-phase type wave in the electrodynamic element 1 with two coupled impedance conductors 14, 15 connected to one another, and a screen conductor 16, the magnetic field energy is concentrated between conductor 14 and conductor 15 (FIG. 13), while an electric field energy is shifted outside conductors 14, 15. This can be explained by the different directions of the transverse components of currents in conductors 14, 15 and by equality of its potentials. The transverse components direction is perpendicular to the direction of the wave propagation.

In the second case (anti-phase excitation) an electric field energy is concentrated between impedance conductors 14, 15 (FIG. 14), while a magnetic field energy will be shifted outside conductors 14, 15. It can be explained by the transverse components of the currents in conductors 14, 15 directions coincidence and by the opposite potentials on the conductors 14, 15. In this case the screen conductor 16 can be absent.

Figure 13:
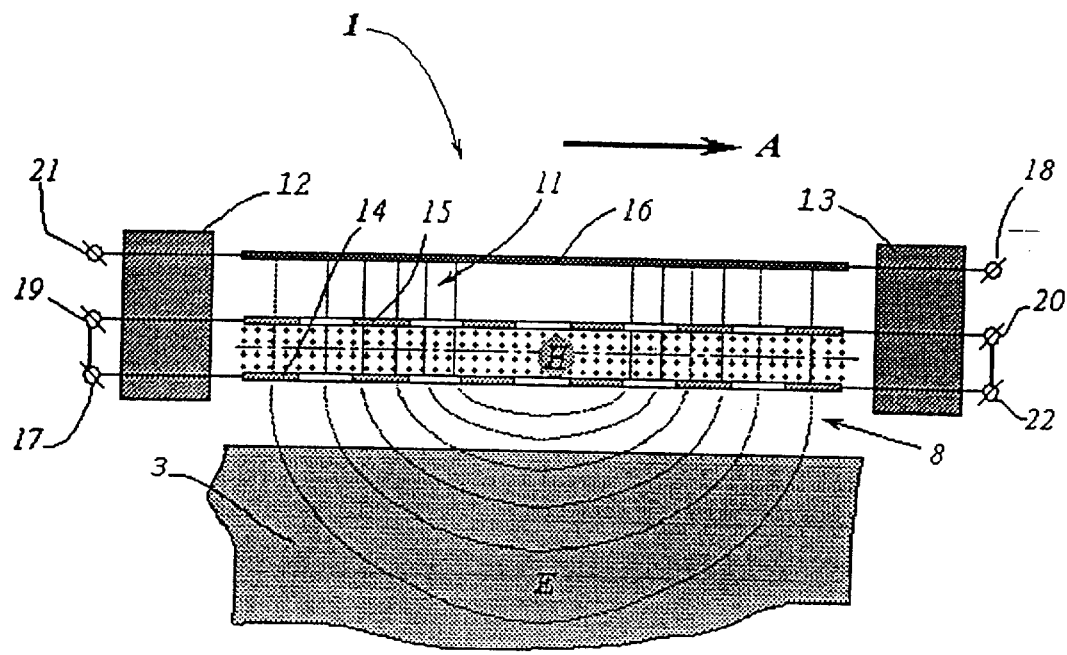
FIG. 13 illustrates the electric field concentration between conductors and outside conductors in an in-phase type wave in the electrodynamic element of the preferred embodiment of the present invention.

The distribution of electric and magnetic components of a slowed electromagnetic wave excited in the electrodynamic element 1 must be chosen depending upon electric parameters of the liquid (material) 3 being monitored. As it was mentioned earlier, the dielectric material's effect is proportional to the electric energy concentrated in the dielectric material 3. Thus, in the case of dielectric materials with a small conductivity, or nonconductive, the electric component of the slowed electromagnetic wave must be shifted into the monitored volume (in the liquid 3 and the region 8), as it is shown in FIG. 13. If a material 3 has dielectric and ferrite properties simultaneously, for example if it is ferrite, both electric and magnetic fields should be shifted in the monitored volume simultaneously or in two different electromagnetic elements 1.

Figure 14:
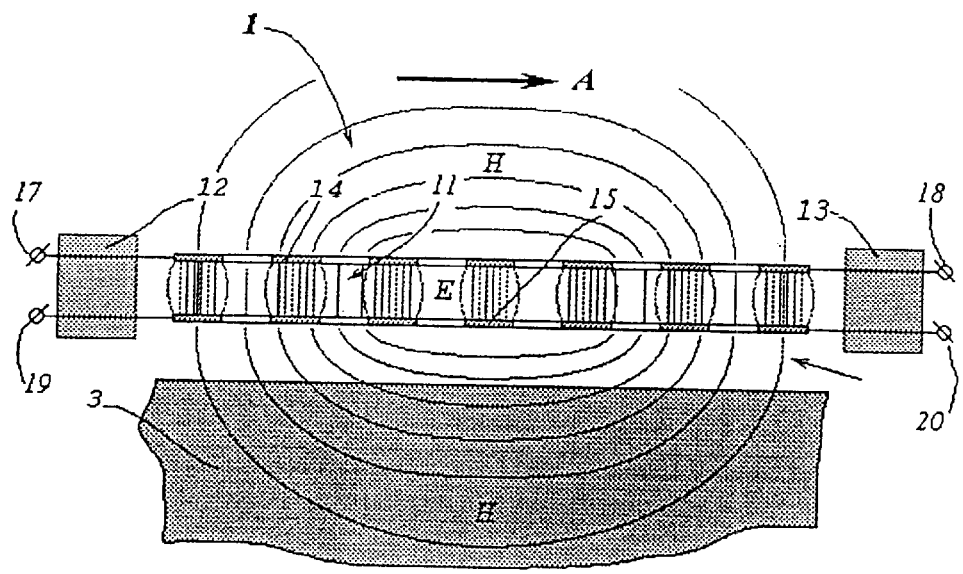
FIG. 14 illustrates an anti-phase type wave electric and magnetic fields distribution in the electrodynamic element of the preferred embodiment of the present invention.

If the liquid (material) 3 is conducting, for example a melted metal, the magnetic field will effect oppositely to that of the electric field and the magnetic field should be shifted from monitored volume, as it is shown in FIG. 13 or, alternatively, the electric field should be shifted from the monitored volume, as it is shown in FIG. 14. The current induced on the metal surface by the magnetic field of the electrodynamic element 1 would increase this magnetic field in the region 8 or in the container 2 wall, if the electrodynamic element 1 is installed outside container 2, as it is shown in FIG. 4.

If the electrodynamic element 1 is made as at least hexapole (FIG. 8), in-phase and anti-phase waves can be excited simultaneously, or one after the other. It allows more informative parameters to be obtained. For example, two or more resonant frequencies can be utilized, which would permit excluding from the resultant measurements the influence of temperature and other errors, the number of excluded influences being equal to the informative parameters number minus one See B. N. Petrov, V. A. Viktorov, B. V. Lunkin, A. S. Sovlukov, "Principals of the Invariance in Measurements" Moscow, Nauka, 1976. The number of informative parameters can be increased by exciting one or both types of waves at different frequencies, for example, at the first resonant frequency, second, etc.

As it was shown earlier, the degree of energy concentration near the electrodynamic element 1 depends on slowing down rate n, and frequency $f$, and increases as n and $f$ increase. It is true for fields presented by the zero space harmonic. The same effect of energy concentration can be obtained by exciting an E- or H-mode wave, or both, with fields presented by the first (plus one and minus one) space harmonics. See Dean A. Watkins "Topics in Electromagnetic Theory", *New York, John Wiley & Sons, Inc.*, p. 2, and Yu. N. Pchelnikov, V. T. Sviridov, "Microwave Electronics" *Moscow: Radio-Svjaz,* 1983, p. 44.

When working with the first (plus one and minus one) space harmonics, the depth of the field penetration into the monitored volume (a thickness δ of the energy concentration area) is determined not by the frequency, the slowing, or the conductivity, as it is in the case of zero space harmonic, but it is determined by the period T of the slow-wave structure, and is approximately equal to $T/\pi$ in symmetrical structures, for example, bifilar helices (FIG. 15), and $T/2\pi$ in two-stage structures, for example, in interdigital combs (FIG. 16). It follows from this that the field distribution of the first space harmonics is proportional to coefficient exp. $(-x\pi/T)$ or exp. $(-2x\pi/T)$, respectively in plane symmetrical and two-stage structures. In the case of bifilar helix, the field distribution, as mentioned above, is defined by the Bessel functions of the first order.

In the case of the first space harmonics energy concentration near impedance conductors 14, 15 is better than in case of zero space harmonic. Such effect of the field concentration can be used at relatively low frequencies for sensitivity increasing. The effective slowing in this case is equal to $\lambda/2T$ for symmetrical structures and is equal to $\lambda/T$ for two-stage structures. Thus, the sensitivity is proportional to the next values:

$$S \sim (V/V_0)\lambda/2TF(\epsilon,\mu,\sigma)f_1,$$

or $$S \sim (V/V_0)\lambda/TF(\epsilon,\mu,\sigma)f_1,$$

where λ is a wavelength in the vacuum. Substituting $f_1=c/\lambda$, where c is the velocity of the light in the vacuum, we obtain $$S \sim (V/V_0)c/2TF(\epsilon,\mu,\sigma),$$

or $$S \sim (V/V_0)c/TF(\epsilon,\mu,\sigma).$$

It is seen, that in the case of the first harmonics sensitivity S does not depend on frequency and increases with period T decreasing.

In most cases slowed waves are so called hybrid waves, comprising both, E- and H-mode waves, and these waves can be presented by different space harmonics. For example, the E-mode in a meander-line (FIG. 17) is presented on the whole by the zero space harmonic, while the H-mode is presented by the first harmonics. The in-phase type wave in the bifilar helix (FIG. 15) comprises E- and H-modes, which are presented by zero space harmonic; the anti-phase type wave comprises the E- and H-modes both being presented by plus one/minus one harmonics.

Figure 18:
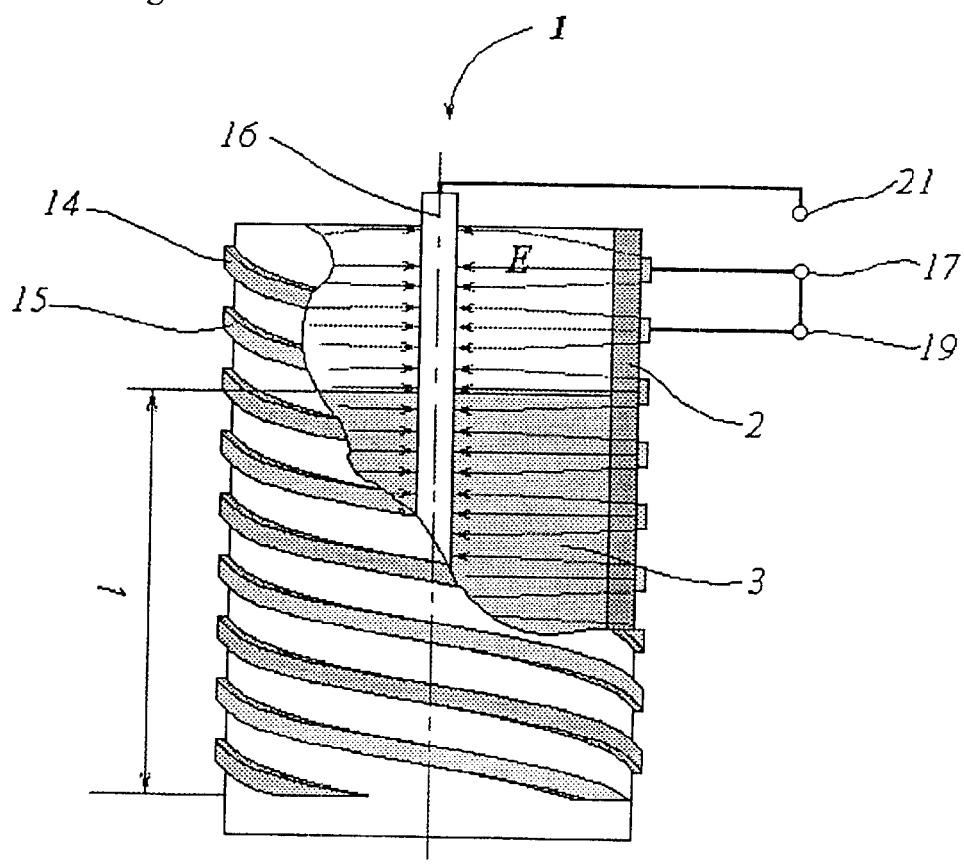
FIG. 18 illustrates a bifilar helix with a screen conductor made as a rod illustrating the electric field penetration through the fluid.
Figure 19:
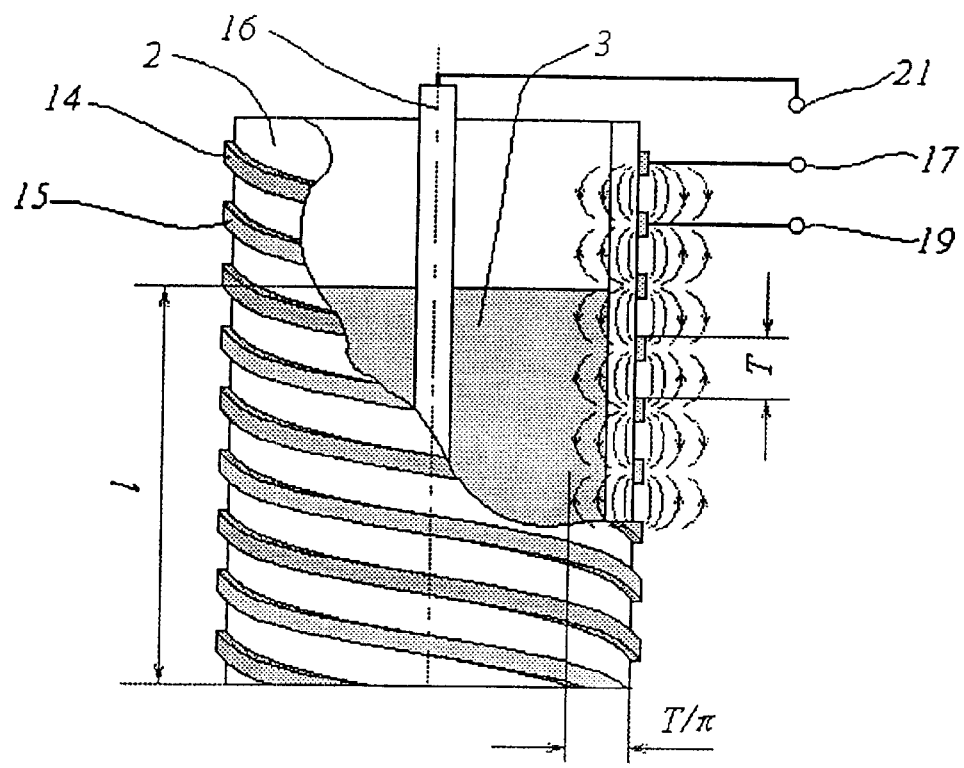
FIG. 19 illustrates a bifilar helix with a screen conductor made as a rod illustrating the electric field is concentrated near the helix.

For example, if a bifilar helix (impedance conductors 14 and 15) with a screen conductor 16 made as a rod (FIGS. 18 and 19) is placed into container 2, filed with a dielectric liquid 3 and in-phase and anti-phase waves simultaneously or one after another are excited, the in-phase wave parameters will depend as upon liquid 3 density (average permittivity) as upon its level l, while the anti-phase wave parameters will depend mainly upon the level l. In the first case the electric field penetrates through the liquid 3 (FIG. 18), in the second case the electric field is concentrated near conductors 14, 15 (FIG. 19).

Existence of a certain distance S' between electrodynamic element 1 and the monitored liquid (material) 3 decreases sensitivity S approximately by a factor of exp. $(-\delta\tau)$, decreasing simultaneously an influence of the monitored liquid (material) 3 electric parameters, for example, the permittivity $\epsilon$, which would cause an alternation on the results of measurements. The electrodynamic analysis of a slow-wave structure's model at relatively big slowing, when $n \approx \tau/k$, (see Yu. N. Pchelnikov "Possibility of Using a Cylindrical Helix to Monitor the Continuity of Media", *Measurement Techniques,* Vol. 38, # 10, 1995, p.p. 1182–1184) showed, that if parameter $\delta'\tau$ exceeds 2 and permittivity $\epsilon$ exceeds 9, the effect of the permittivity alteration is very small More accurate calculation allowed to connect a relative error $\Delta l/l$ of the level measurements with the parameter $\delta'\tau$, the permittivity $\epsilon$ relative alteration $\Delta\epsilon/\epsilon$, and the relative permittivity $\epsilon_1$ of the medium between the electrodynamic element 1 and the monitored liquid (material) 3, for example the container 2 wall, $$\Delta l/l = (\epsilon_1/\epsilon)(th\delta'\tau - cth\delta'\tau)\Delta\epsilon/\epsilon,$$

where "th" indicates hyperbolic tangent and "cth" indicates hyperbolic cotangent. If, for example, $\epsilon_1/\epsilon=0.05$, $\delta'\tau=1$, then 1% dielectric permittivity $\epsilon$ alteration $(\Delta\epsilon/\epsilon)$ leads to a relative error $(\Delta l/l)$ smaller than 0.0276%.

The alteration of the monitored liquid (material) 3 electric parameters do not effect the results of the level (height) measurement if a slowing n is relatively small and is approximately equal to the square root of relative permittivity $\epsilon$ of the monitored liquid (material) 3, $$n \approx \sqrt{\epsilon}$$

In this case the transverse constant $\tau$ in the monitored dielectric is nearly equal to zero and the monitored material effects on slowing as metal screen, see Yu. N. Pchelnikov "Radiation of Slow Electromagnetic Waves in a magnetic Insulator", *Journal of Communications Technology and Electronics, Scripta Technica, Inc., A Wiley Company,* Vol. 40, # 6, 1995, p.p. 25–30.

A variation in level (height) causes a variation of the propagation constant γ due to the effect of the liquid (material) 3 electric parameters depending on the field distribution in the slowed electromagnetic wave. For example, gasoline increases the imaginary part of the propagation constant γ; highly conductive materials, in some cases decrease the imaginary part of γ, some acids will increase both imaginary and real parts, etc.

Figure 20:
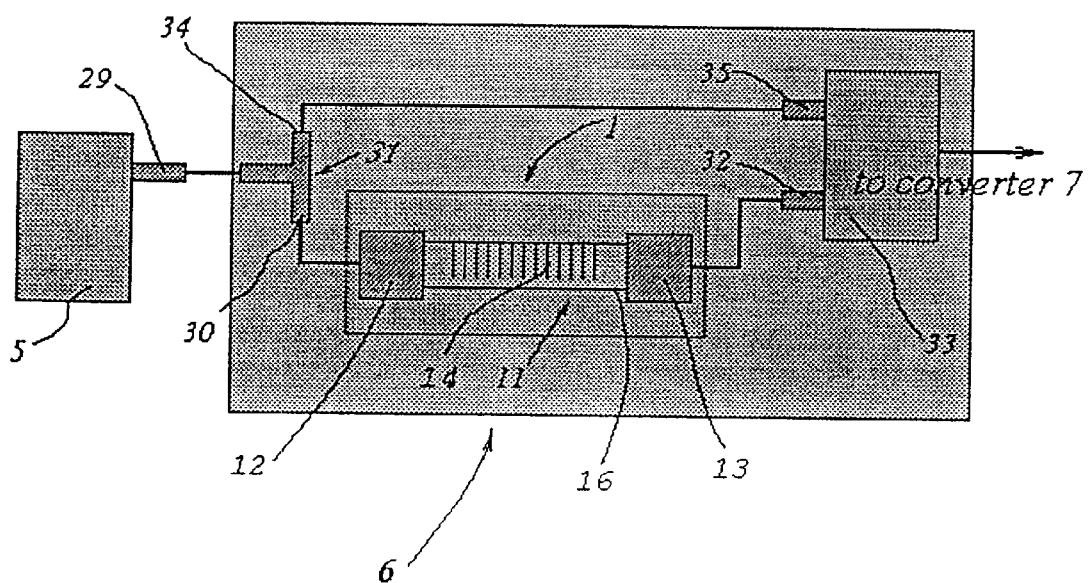
FIG. 20 illustrates the preferred circuit of the attenuation measurement of the preferred embodiment of the present invention.

The variation of the real part of the propagation constant γ is indicated by the attenuation of the slowed electromagnetic wave in the electrodynamic element 1. The preferred circuit of the attenuation measurement is shown in FIG. 20. Here the electromagnetic signal from the output 29 of the generator 5 (standard RF generator can be element 1, slow-wave structure 11 and output 13, passes through the input 32 of a standard amplitude comparator 33 and is compared with, the signal from the end 34 of the signal divider 31, connected to the input 35 of the comparator 33. The results of this comparison in voltage are converted into the level by the converter 7, which can be standard voltmeter. Other measuring circuits can be used too.

Figure 21:
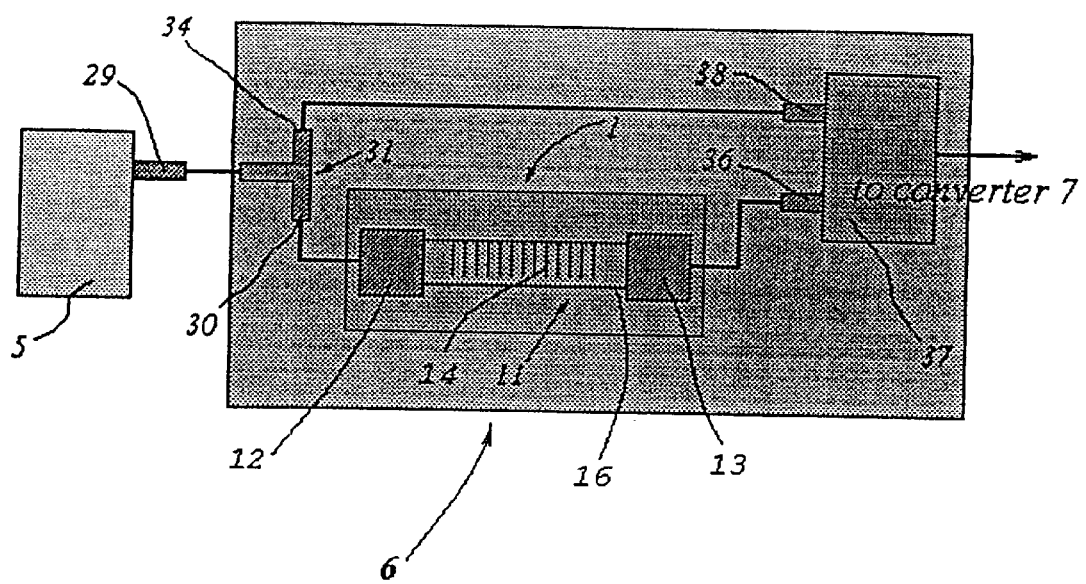
FIG. 21 illustrates the preferred circuit of the preferred embodiment of the present invention for phase delay measurement.

The variation of the imaginary part of the propagation constant γ is indicated by the phase delay measurement. The preferred circuit is shown in FIG. 21. Here the electromagnetic signal from output 29 of generator 5 passes through end 30 of the signal divider 31, input 12 of the electrodynamic element 1, slow-wave structure 11, output 13 and gets to input 36 of a standard phase comparator 37 with the voltage output, its phase being compared with phase of a signal coming to the input 38 of the comparator 37 from the end 34 of the signal divider 31. The results of this comparison in voltage are converted into the level by the converter 7, which can be a standard voltmeter. Other measuring circuits can be used too.

Figure 22:
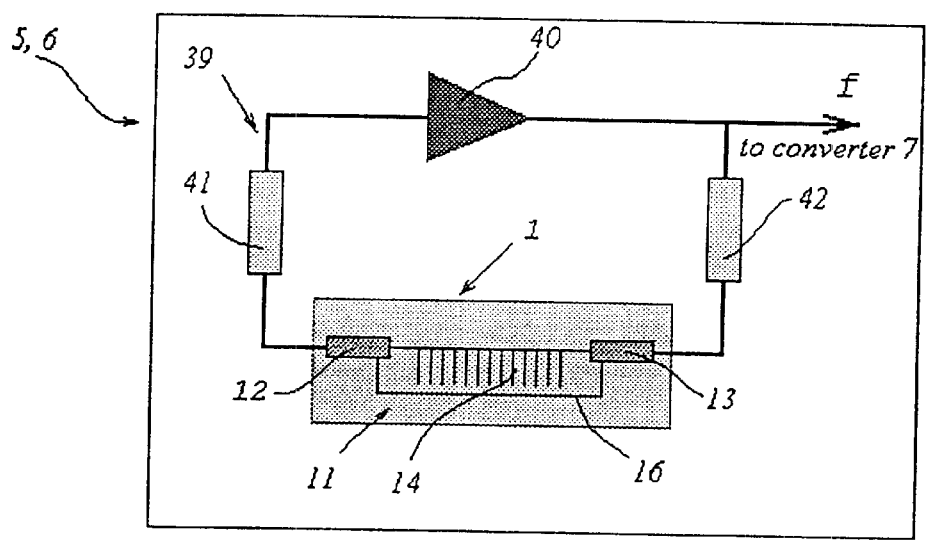
FIG. 22 illustrates a preferred circuit of the preferred embodiment sharing conversion to generator frequency alteration.

The variation of the phase delay can be also converted into generator 5 frequency alteration $\Delta f$. It can be done by the electrodynamic element 1 sequence inserting in the feedback network 39 of amplifier 40 (FIG. 22). Filter circuits 41 and 42 in feedback 39 can be inserted to increase stability of the generator 5. In this case the generator 5 takes part of the primary transducer 6, converting a phase delay alteration into the frequency alteration.

The variation of the imaginary part of the propagation constant γ can be also indicated by the resonance frequencies $f_1$ of the electrodynamic element 1 variation. If the slow-wave structure 11 is open ended (the end 13 is open), $$f_1 = c(2i-1)/(4b \cdot n),$$

where c is the light velocity in the vacuum, i=1, 2, . . . is a resonant frequency number, b is the length of the slow-wave structure 11, n is a slowing down value.

If the slow-wave structure 11 is short ended (the end 13 is closed), then $$f_1 = ci/(2b \cdot n).$$

Figure 23:
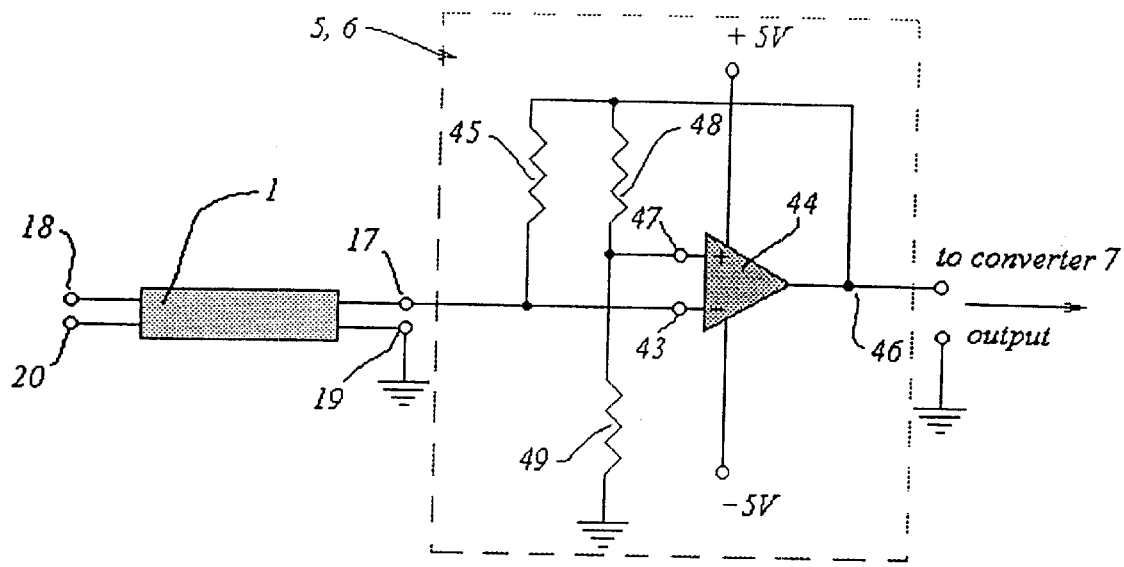
FIG. 23 illustrates the preferred circuit of the preferred embodiment of the present invention to cause alteration of the resonant frequency.

The resonance frequency $f_1$ can be measured by standard net analyzer or by other devices. If the electrodynamic element 1 includes two-conductor slow-wave structure 11, for example a bifilar helix, the preferred circuit to convert alteration of resonant frequency to informative parameter is very simple and combine, as it was in the previous example, the generator 5 and transducer 6 (FIG. 23). Here pole 17 of the electrodynamic element 1 is connected to the inverting input 43 of an operational amplifier 44; the other pole 19 is connected to the earth (it could be the pole 21 if the other conductor of the slow-wave structure would be screen conductor 16). The poles 18, 20 can be open ended, short ended or terminated. It depends on liquid (material) 3 electric parameters. For example, if it is dielectric, they can be open ended or terminated on a big inductance. Simultaneously, the inverting input 43 is connected through a resistance 45 to the output 46 of amplifier 44 and the non-inverting input 47 is connected through a resistance 48 to the output 46 and is connected through a resistance 49 to the earth, forming a Schmitt trigger (see "The Penguin Dictionary of Electronics", second edition, p. 505). The signal from the output 46 has meander configuration with frequency near the resonance frequency of the electrodynamic element 1.

As discussed above, the apparatus for liquid level measuring comprises an electrodynamic element 1, connected to a measuring circuit 4 (FIGS. 2–5), the last including a generator 5 of electromagnetic oscillations, a transducer 6, connected to a converter 7, converting an electric signal to indicate the measured parameters, such as liquid level (FIGS. 6 and 7). The electrodynamic element 1 (FIG. 8) includes at least one slow-wave structure 11, input 12 and output 13, connected to the ends of the slow-wave structure 11. The slow-wave structure 11 includes at least one impedance conductor 14, fashioned as a row of conducting members arranged in series in the direction of the slowed wave propagation (arrow A) and connected to one another with spacing, and a screen conductor 16, made as a tape, plate, cylinder, etc. For example, impedance conductor 14 in FIG. 24 includes conducting fingers 50 connected one to another in the direction of arrow A by a conducting base 51 with gaps 52. The screen conductor 16 can be made as a conducting plate.

Also, as discussed above, slow-wave structure 11 can include two or more impedance conductors (14 and 15 in FIG. 8) and, as a rule, one screen conductor 16. From one end of slow-wave structure 11 all its conductors are connected to the input 12, each to one pole, for example, impedance conductor 14 in FIG. 8 is connected to the pole 17, impedance conductor 15—to the pole 19 and the screen conductor 16—to the pole 21. From the other end of the slow-wave structure all its conductors are connected to the output 13, conductor 14—to the pole 18, conductor 15—to the pole 20, conductor 16—to the pole 22. The input 12 and output 13 can be standard coaxial adapters, or can be made from cable or wires.

In most cases the electrodynamic element 1 forms a multipole, such as a dipole, quadripole or hexapole element, as it is shown in FIG. 8 (with poles 17, 19, 21 from one end and poles 18, 20, 22 from the other end).

Figure 25:
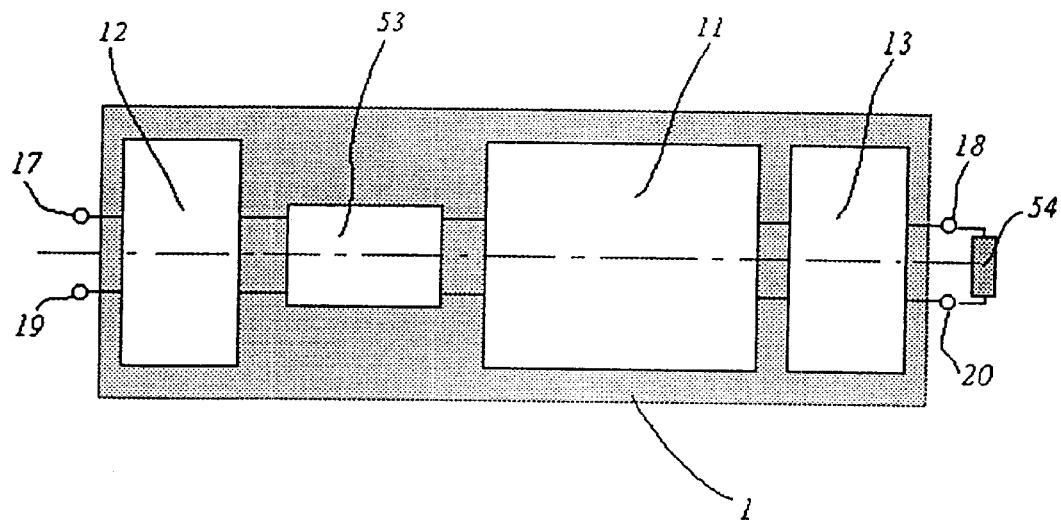
FIG. 25 illustrates an additional slow-wave structure 53 in the electrodynamic element, terminated to an inductor 58 having a big induction.

In some cases, when the distribution of electric or magnetic field along the slow-wave structure should be homogeneous, a section of slow-wave structure 53 described below (FIGS. 25, 27) should be added in series to the slow-wave structure 11. If the electrodynamic element 1 is open ended or terminated to an inductor 54 having big inductance, as it is shown in FIG. 25, the slow-wave structure 53 must have the wave impedance (characteristic impedance) $Z_1$ much bigger than the wave impedance $Z_2$ of the slow-wave structure 11. If the electric length (a phase delay φ) in both structures is the same (the preferred case), the first resonance frequency $f_1$ of the electrodynamic element 1 is defined by the expression (see Yu. N. Pchelnikov, A. A. Elizarov, "Quasiresonators Using Slowing Down Systems" *Radioelectronics and Communications Systems*, Vol. 34, # 10, 1991, pp. 68–72.)

$$f_1 = c\varphi/2\pi nb$$

$$\varphi \approx \sqrt{Z_2/Z_1}$$

where c is the velocity of light in the vacuum, b is the slow-wave structure 11 length, n is slowing in the slow-wave structure 11. In this case a distribution of the electric-field energy along slow-wave structure 11 is proportional to $$\cos^2\beta z,$$

$$\beta z \leq \phi,$$

where β is the phase constant in the slow-wave structure 11, z is the coordinate along the structure 11. Thus, if the whole phase delay φ is smaller 0.3 (e.g. $Z_1/Z_2$ is larger than 9), $$\cos^2 bz > 0.8.$$

This means the electric-field energy decrease along the electrodynamic element 1 is smaller than 20%.

Figure 26:
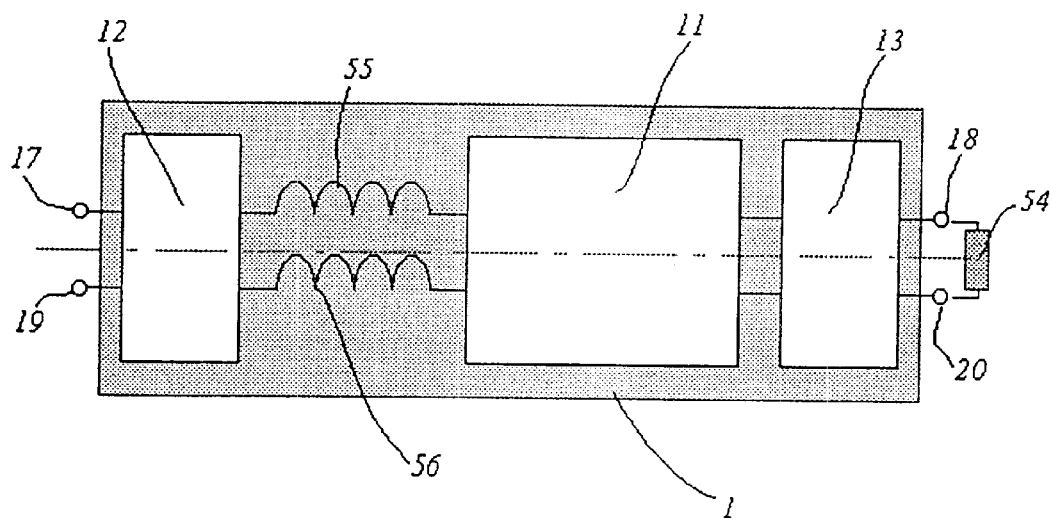
FIG. 26 illustrates an electrodynamic element wherein an additional slow-wave structure is replaced by two inductors.

In the case under consideration the additional slow-wave structure 53 can be replaced by two inductors 55, 56 with relatively small inductance $L_1$ and $L_2$. (FIG. 26). Though the preferable case is when $L_1=L_2=Z_2/\pi\phi$, one inductor can be used also.

Figure 27:
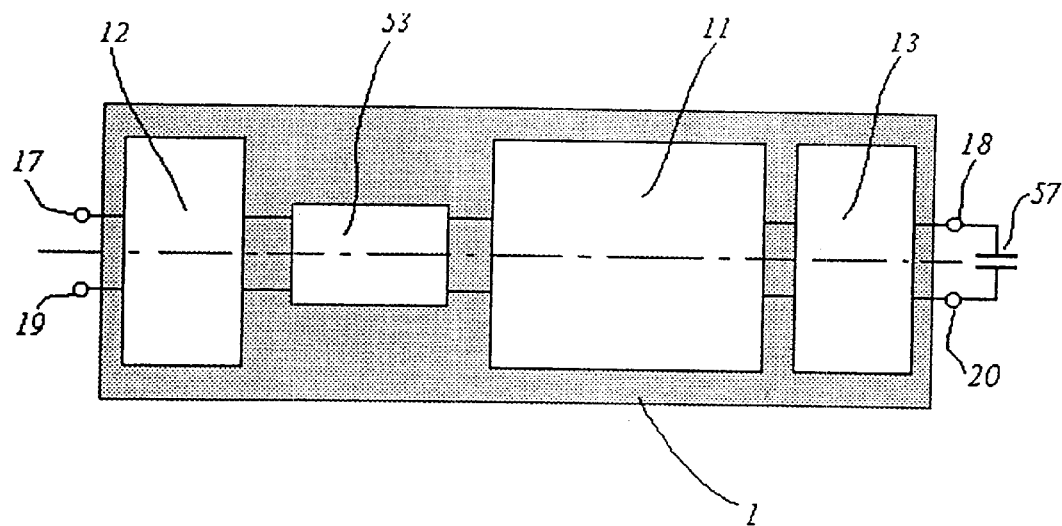
FIG. 27 illustrates an additional slow-wave structure 53 in the electrodynamic element terminated to a capacitor, having a big capacitance.

If the electrodynamic element 1 is short ended or terminated to a big capacitance 57, as it is shown in FIG. 27, and homogeneous distribution of the magnetic field energy along slow-wave structure 11 should be obtained, the wave resistance $Z_1$ of the additional slow-wave structure 53 must be chosen much smaller than the wave resistance $Z_2$ of the slow-wave structure 11. In this case, if a phase delay in both slow-wave structures is the same and equal to φ, the magnetic field energy distribution along slow-wave structure 11 is proportional to $$\cos^2\beta z$$

and $$\phi \approx \sqrt{Z_2/Z_1}$$

If φ<0.3, then $\cos^2$, βz<0.8 and the magnetic field distribution along the electrodynamic element 1 does not alter more than 20%.

Figure 28:
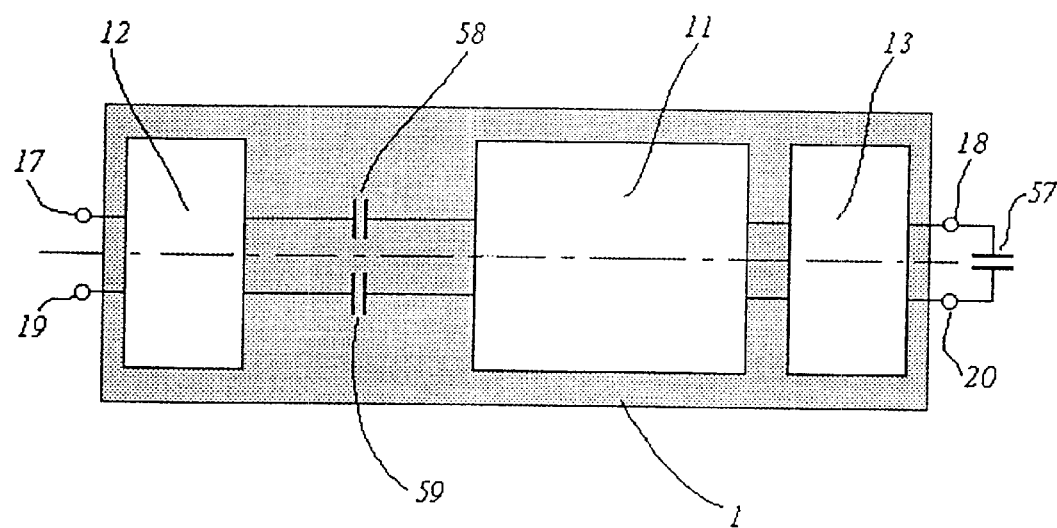
FIG. 28 illustrates an electrodynamic element wherein an additional slow-wave structure is replaced by two capacitors.

The additional slow-wave structure 53 can be replaced by two capacitors 58, 59 with relatively big capacitance $C_1$ and $C_2$ (FIG. 28) Though the preferable case is when $C_1=C_2=1/Z_2\pi\phi$, one capacitor can be used also.

Figure 24:
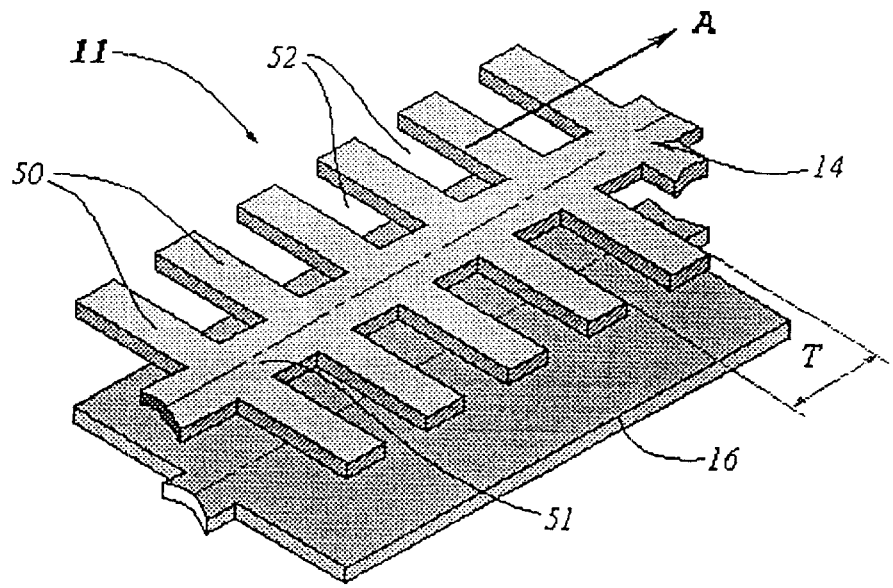
FIG. 24 illustrates impedance and screen conductors.

Commonly, impedance conductors of the slow-wave structure have a constant period T, as it is shown in FIG. 24. The slowing n varies approximately in inverse proportion to T. Changing the slowing n one can change the energy concentration. It follows from this that the T variation along the slow-wave structure 11 can be used for the energy distribution adjustment.

Figure 29:
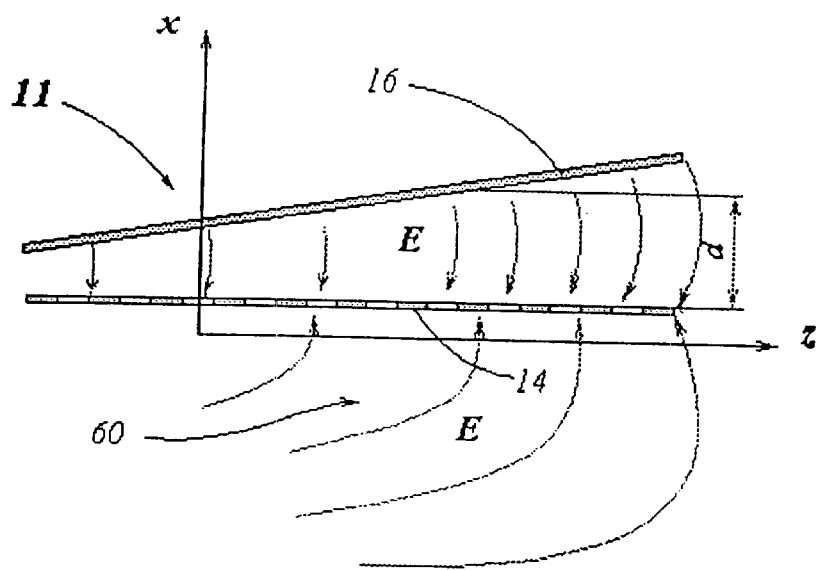
FIG. 29 illustrates varying the distance between conductors of a slow-wave structure.
Figure 30:
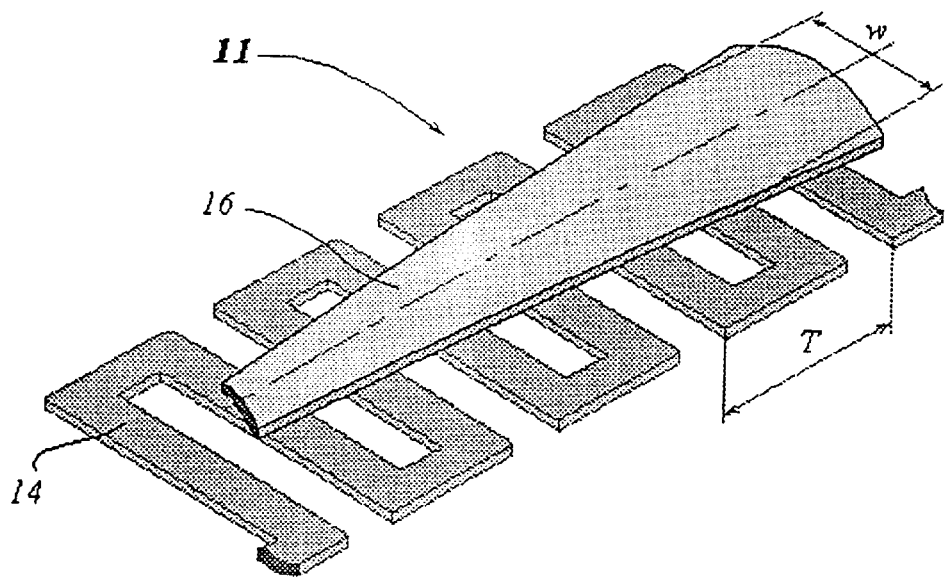
FIG. 30 illustrates a varying screen conductor width.

The energy distribution in the monitored volume can be adjusted also by the variation of the distance d between slow-wave structure 11 conductors, for example, between impedance conductor 14 and the screen conductor 16, as it is shown in FIG. 29. The distance between conductors 14 and 16 increasing leads to the energy increasing in the area 60 outside the conductor 14. The same effect can be achieved by the conductor 16 width w altering along the structure 11, as it is shown in FIG. 30. The width decreasing as the distance increasing is accompanied by a screening decreasing.

Figure 12:
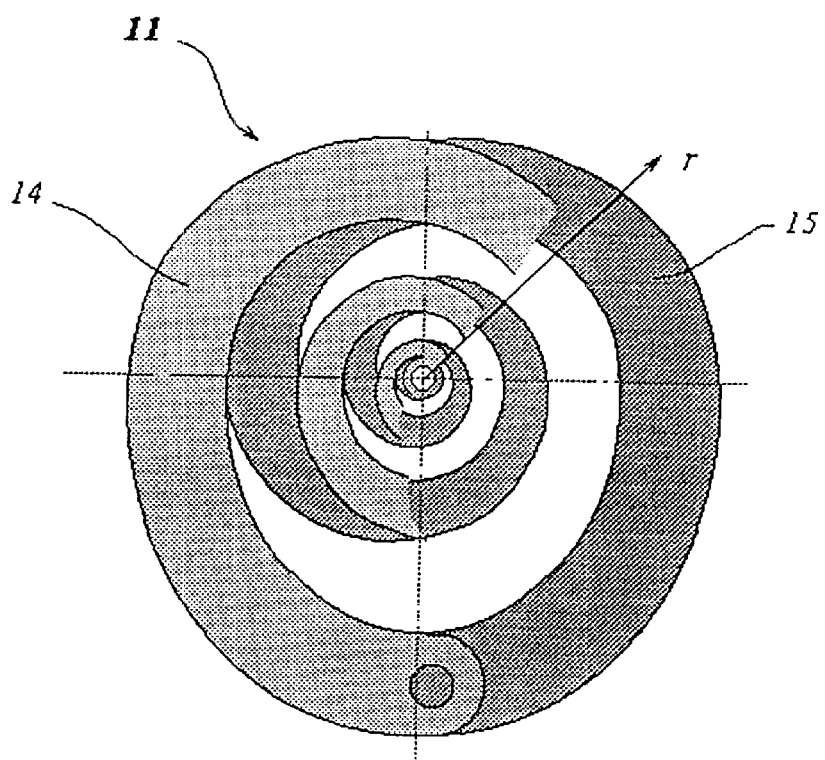
FIG. 12 shows a two-conductor slow-wave structure with an impedance conductor and a screen conductor using oppositely directed radial spirals.
Figure 17:
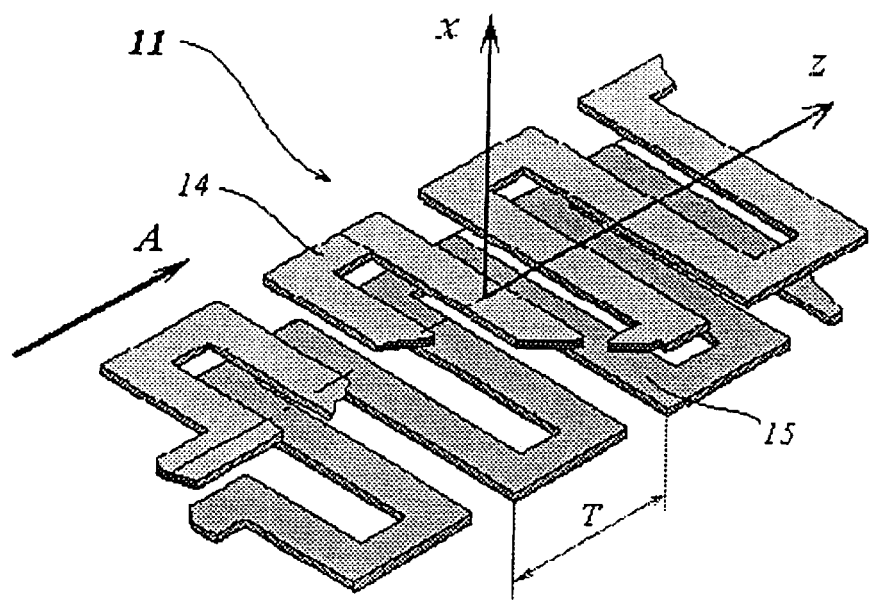
FIG. 17 illustrates the coupled meander-lines of the preferred embodiment of the present invention.

As was stated above, a slow-wave structure can be done with two impedance conductors installed on the same surface one in the other, as it is shown in FIGS. 15 and 16, or installed one opposite the other, as it is shown in FIGS. 12 and 17. In both cases in-phase and anti-phase waves can be excited. This allows one to achieve different distribution of the electric-field and magnetic-field energy in the cross section of the slow-wave structure 11. The greatest difference in the energy distribution is achieved in the coupled slow-wave structures, for example, radial spirals with opposite directions of winding (FIG. 12) or meander-lines, shifted in the longitudinal direction one to another on the half period, e.g. on T/2 (FIG. 17). It is seen that configuration of such impedance conductors are mirror images of one another turned through 180°.

If the impedance conductors 14, 15 are installed outside the container 2 on its wall and anti-phase wave is excited, the energy distribution, as it was shown earlier, is defined by a period T. In this case the thickness of the energy distribution area is equal to T/π in the symmetrical structures (FIG. 19) and to T/2π in the two-stage structures (FIG. 16). It follows from this that the container 2 wall thickness must not exceed T/π in the first case and T/2π in the second case.

If the container 2 has a relatively small diameter and is made from a dielectric material, the impedance conductors 14, 15 can be made as two identical helices, forming a two-wire helix. The screen conductor can be made as a rod (FIGS. 18 and 19), that allows one to monitor simultaneously the liquid 3 level and its density, The same structure wound on the dielectric tube 61 (FIG. 31) is convenient for a dielectric liquid 3 monitoring inside the container 2. In this case a thin dielectric coating 62 can protect conductors 14 and 15.

Figure 32:
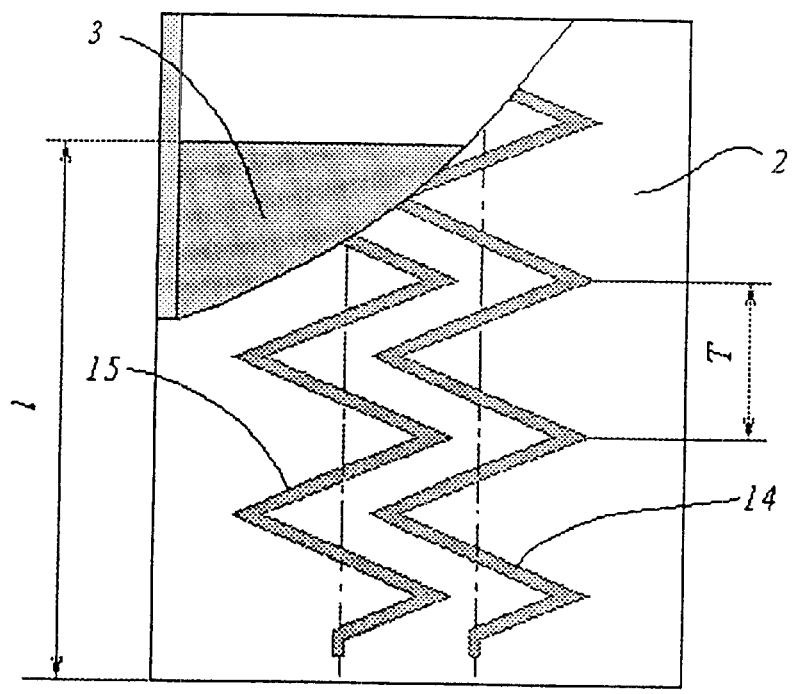
FIG. 32 illustrates a zigzag slow-wave structure installed on a dielectric container wall.
Figure 33:
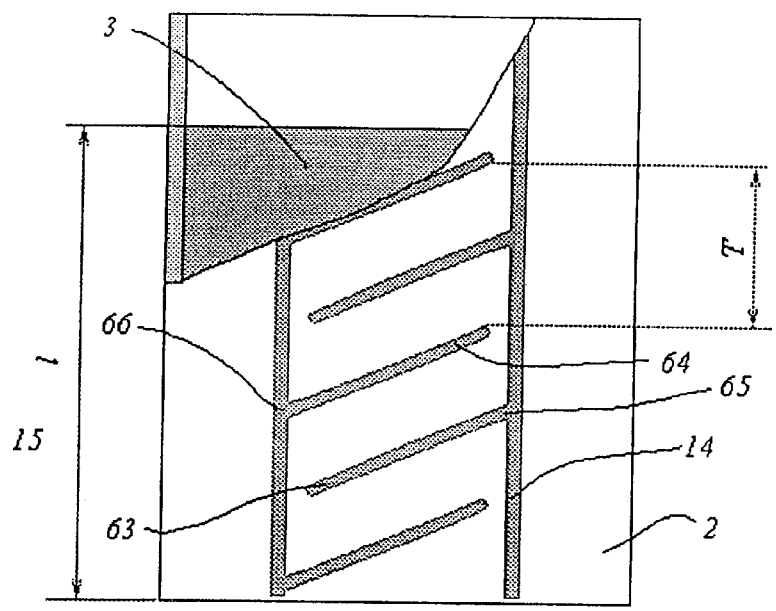
FIG. 33 illustrates a slow-wave structure having interdigital combs with inclined fingers.
Figure 34:
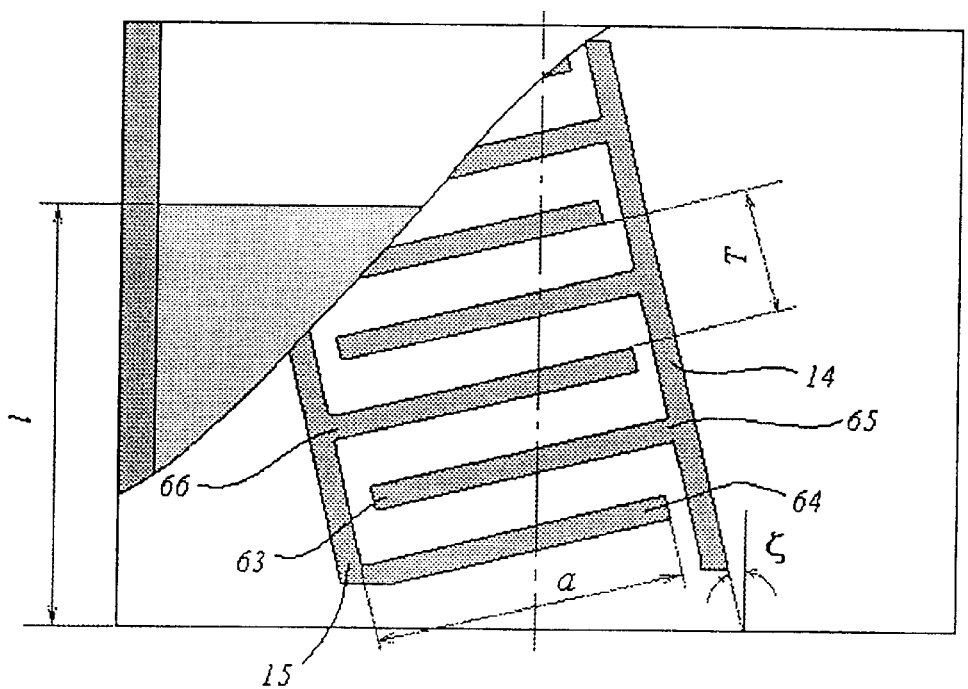
FIG. 34 illustrates a slow-wave structure with an inclined combination of interdigital combs.

If the container 2 is made from a dielectric material and is relatively large, the slow-wave structure 11 can be installed on the small section of the container 2 on the inner or outer surface of its wall. It can be two identical zigzag-lines, shown in FIG. 32, or interdigital combs, shown in FIGS. 33 and 34. To make the level measurement more uniform the fingers 63 of one comb (conductor 14) and the fingers 64 of the other comb (conductor 15) must incline so that its bases 65, 66 must lay in the same horizontal plane, as it is shown in FIGS. 33, 34. In FIG. 33 fingers 63, 64 are inclined. In FIG. 34 the both combs (conductors 14, 15) are inclined with angle ζ to a vertical in accordance to condition $$\sin \zeta = T/2a,$$

where T is period of conductors 14, 15, a is the length of fingers 63, 64.

Figure 35:
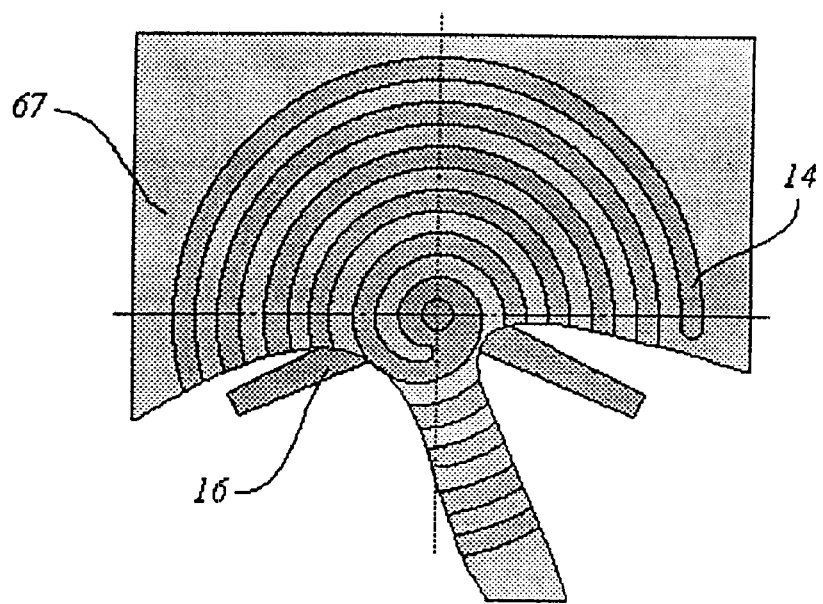
FIG. 35 illustrates an arithmetic spiral for the impedance conductor.
Figure 36:
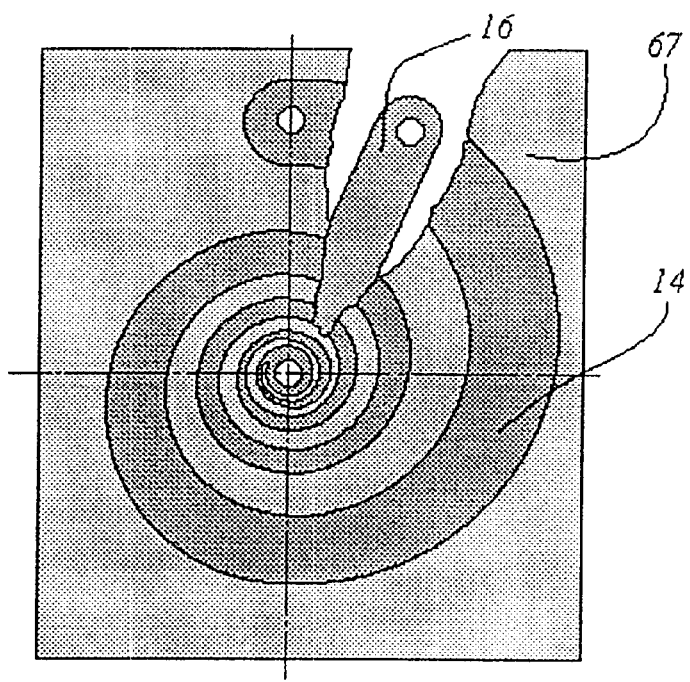
FIG. 36 illustrates a logarithmic spiral for impedance conductor.

If the electrodynamic element 1 is installed in parallel to the liquid surface, the impedance conductor 14 of the slow-wave structure 11 can be made as a radial spiral, for example, an arithmetic spiral (FIG. 35) or logarithmic spiral (FIG. 36), made as metallization on one side of a dielectric substrate 67. The screen conductor 16 can be made as at least one radial beam on the other side of the substrate 67.

Figure 31:
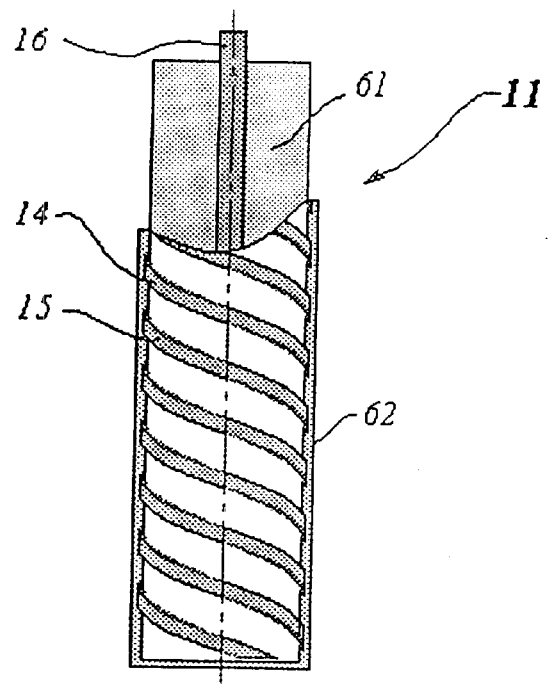
FIG. 31 illustrates a bifilar helix wound on a dielectric tube with a screen conductor as a rod.
Figure 37:
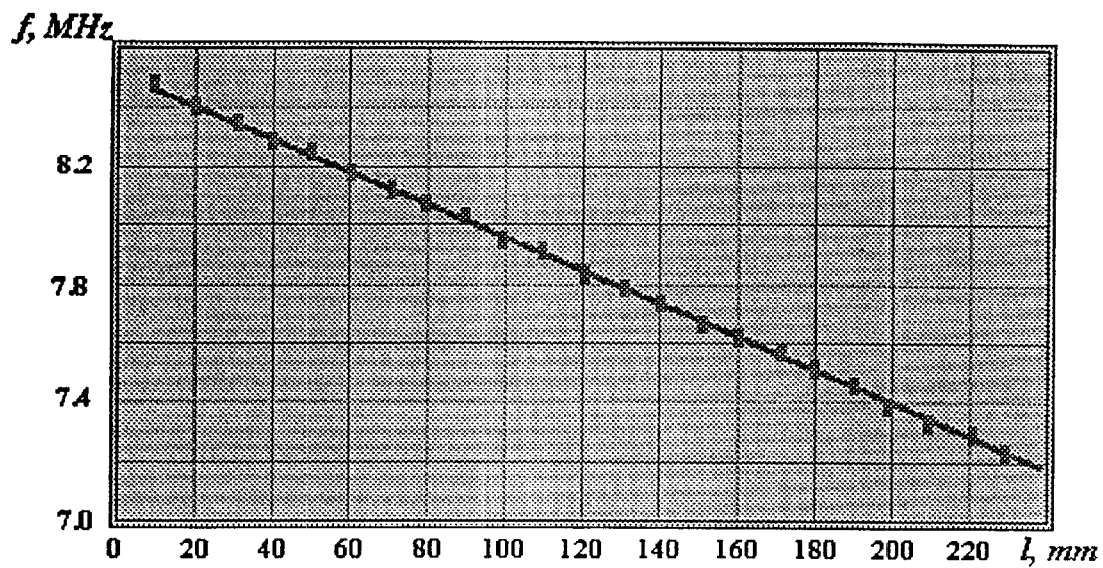
FIG. 37 illustrates a graph showing the resonant frequency of the electrodynamic element dependence upon water level in a container.
Figure 38:
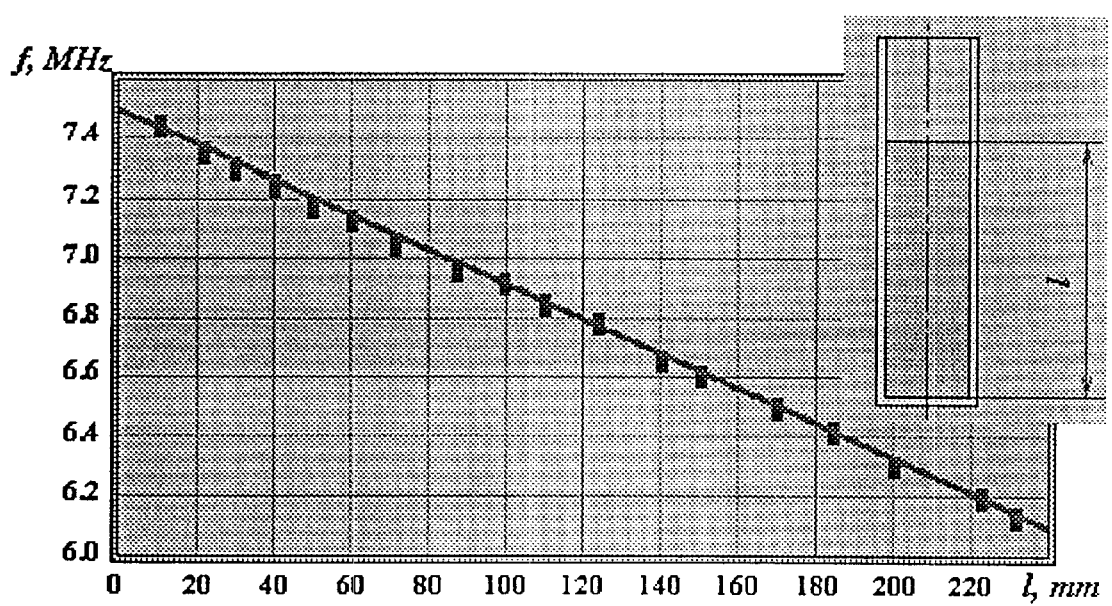
FIG. 38 illustrates frequency dependence of the electrodynamic element including bifilar helix upon the water level in a container.

The resonance frequency f of the electrodynamic element shown in FIG. 33 dependence upon the water level in a Teflon container 2 is presented in FIG. 37. The small inductors were connected to the conductors 14, 15, as it was shown in FIG. 26. Analogous dependence for the electrodynamic element 1 including bifilar slow-wave structure 11 shown in FIG. 31 is presented in FIG. 38.

Other applications of this method and apparatus may be made, such as measuring rotation, linear displacement thickness of thin films, and medical application. Accordingly, because many varying and different embodiments may be made within the scope of inventive concepts herein taught including equivalent structures of materials hereafter thought of, and because many modifications may be made in the embodiments herein detailed in accordance with descriptive requirements of the law, it is to be understood that the details herein are to be interpreted as illustrative and not in a limiting sense.

What is claimed in this invention is:

1. An apparatus monitoring one or more parameters of variable physical structure, comprising:
    an electrodynamic element 1, a measuring circuit, including at least radio frequency generator 5, a primary transducer 6 and a converter converting an electric signal into the parameter;
    said electrodynamic element 1 includes an input 12, an output 13 of RF signal and a section of a slow-wave structure 11 set to distribute in a given ratio the components of an electric and magnetic fields in the monitored structure ("a multipole");
    said slow-wave structure further including at least two conductors 14, 16, at least one of them being an impedance conductor 14 facing the monitored structure and fashioned as row of conducting members 50 arranged in series in the direction of the slowed wave propagation and connected to one another with spacing 52.
2. An apparatus according to claim 1, wherein said multipole includes an additional section of a two-conductor slow-wave structure.
3. An apparatus according to claim 1, wherein said multipole includes at least one inductance.
4. An apparatus according to claim 1, wherein said multipole includes at least one capacitance.
5. An apparatus according to claim 1, wherein said slow-wave structure comprising at least one screen conductor.
6. An apparatus according to claim 1, wherein said period T of said row of conducting members alters along the slow-wave structure.
7. An apparatus according to claim 1, wherein the distance between said two conductors of said slow-wave structure alters along its length.
8. An apparatus according to claim 1, wherein the width of at least one of said conductors of said slow-wave structure alters along its length.
9. An apparatus according to claim 1, wherein said impedance conductor includes at least one-wire cylindrical helix.
10. An apparatus according to claim 9, wherein said screen conductor includes a rod.
11. An apparatus according to claim 9, wherein said screen conductor includes a cylinder.
12. The apparatus according to claim 9, wherein said screen conductor includes at least one tape.
13. The apparatus according to claim 1, wherein said impedance conductor includes at least one-wire radial spiral, the screen conductor including at least one radial beam.
14. The apparatus according to claim 1, wherein said slow-wave structure comprising at least two impedance conductors.
15. The apparatus according to claim 14, wherein said impedance conductors facing each other and are configured as mirror images of one another turned through 180°.
16. The apparatus according to claim 15, wherein said impedance conductors are made as radial spirals with opposite directions of winding.
17. The apparatus according to claim 1, wherein said impedance conductors being identical and placed on the same surface one in the other.
18. The apparatus according to claim 17, wherein the structure includes a cylinder having a dielectric wall; and
    said impedance conductors form a symmetrical slow-wave structure and are installed on the dielectric wall of the container, splitting said impedance conductors from the monitored volume, the period T of impedance conductors being chosen in accordance with the condition:

$$T > \pi \delta,$$

where $\delta$ is a dielectric wall thickness.

19. The apparatus according to claim 17, wherein the structure includes a cylinder having a dielectric wall; and
    said impedance conductors form a two-stage slow-wave structure and are installed on the dielectric wall of the container, splitting said impedance conductors from the monitored volume; and
    the period T of impedance conductors is chosen in accordance with the condition:

$$T > 2\pi\delta,$$

where $\delta$ is a dielectric wall thickness.

20. The apparatus according to claim 19, wherein said impedance conductors are made as zigzag-lines.
21. The apparatus according to claim 19, wherein said impedance conductors are made as vertically placed interdigital combs with fingers inclined so that the bases of the each finger of both combs are on the same horizontal plane.
22. The apparatus according to claim 19, wherein said impedance conductors are made as interdigital combs and are installed on the dielectric wall of the container with angle $\zeta$ to a vertical in accordance to condition:

$$\sin \zeta = T/2a$$

where T is period of combs, a is the fingers length.

23. The apparatus according to claim 18, wherein said impedance conductors are made as cylindrical helices, mounted on a dielectric base and forming a bifilar helix.
24. The apparatus according to claim 1, wherein said multipole is a dipole.
25. The apparatus according to claim 1, wherein said multipole is a quadripole.
26. The apparatus according to claim 1, wherein said multipole is a hexipole.

* * * * *